(12) United States Patent
Synnergren et al.

(10) Patent No.: US 8,447,340 B2
(45) Date of Patent: May 21, 2013

(54) MULTICAST PUSH TO TALK GROUPS, APPARATUS, AND METHODS

(75) Inventors: Per Synnergren, Luleå (SE); Jan Holm, Örbyhus (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 355 days.

(21) Appl. No.: 11/696,428

(22) Filed: Apr. 4, 2007

(65) Prior Publication Data

US 2008/0247373 A1  Oct. 9, 2008

(51) Int. Cl.
*H04B 15/00* (2006.01)

(52) U.S. Cl.
USPC ........ 455/518; 455/414.1; 455/519; 455/517; 455/516; 455/90.2; 370/401

(58) Field of Classification Search
USPC ............... 370/401, 338, 328; 455/414.1, 518, 455/519
See application file for complete search history.

(56) References Cited

U.S. PATENT DOCUMENTS

| | | | |
|---|---|---|---|
| 6,970,926 B1 * | 11/2005 | Needham et al. | 709/225 |
| 2003/0086413 A1 | 5/2003 | Tartarelli et al. | |
| 2003/0148779 A1 | 8/2003 | Aravamudan et al. | |
| 2006/0058052 A1 * | 3/2006 | Plestid et al. | 455/519 |
| 2006/0276213 A1 | 12/2006 | Gottschalk et al. | |
| 2008/0101354 A1 | 5/2008 | Arndt | |

FOREIGN PATENT DOCUMENTS

| | | |
|---|---|---|
| EP | 1 365 545 A1 | 11/2003 |
| EP | 1 638 354 A1 | 3/2006 |
| WO | 02/098153 A1 | 12/2002 |
| WO | 03/021811 A1 | 3/2003 |

OTHER PUBLICATIONS

"Push to Talk Over Cellular (PoC)—Architecture", Draft Version 2.0, Mar. 26, 2007, Open Mobile Alliance Ltd.
International Search Report and Written Opinion mailed Nov. 19, 2008 in corresponding PCT application PCT/SE2008/050830.
International Search Report and Written Opinion mailed Sep. 2, 2008 in corresponding PCT application PCT/SE2008/050376.
3GPP TS 22.146 V6.7.0, $3^{rd}$ Generation Partnership Project; Technical Specification Group Services and System Aspects; Multimedia Broadcast/Multicast Service (MBMS); Stage 1 (Release 6) (Mar. 2006).

(Continued)

*Primary Examiner* — Kamran Afshar
*Assistant Examiner* — Shahriar Behnamian
(74) *Attorney, Agent, or Firm* — Nixon & Vanderhye, P.C.

(57) ABSTRACT

A terminal (such as that belonging to or carried by an emergency first responder, for example) participates in a push to talk multicast group in either of two modes or levels. In a first mode or first level of participation, the terminal can join a multicast address for the push to talk multicast group as a passive recipient of transmissions and can thereby listen to the multicast address. In a second mode or second level of participation, the terminal becomes an active participant in the push to talk session. As an active participant in the push to talk session, the terminal can, e.g., receive sender identification (e.g., identification of other participants who may be talking in the push to talk multicast group) and send media bursts to the multicast group.

31 Claims, 14 Drawing Sheets

OTHER PUBLICATIONS

3GPP TS 23.246 V6.11.1, 3$^{rd}$ Generation Partnership Project; Technical Specification Group Services and System Aspects; Multimedia Broadcast/Multicast Service (MBMS); Architecture and functional description (Release 6) (Dec. 2006).

3GPP TS 25.346 V6.9.1, 3$^{rd}$ Generation Partnership Project; Technical Specification Group Services and System Aspects; Introduction of the Multimedia Broadcast/Multicast Service (MBMS) in the Radio Access Network (RAN); Stage 2 (Release 6) (Sep. 2006).

3GPP TS 43.246 V7.3.0, 3$^{rd}$ Generation Partnership Project; Technical Specification Group Services and System Aspects; Multimedia Broadcast/Multicast Service (MBMS) in the GERAN; Stage 2 (Release 7) (Nov. 2006).

3GPP TR 25.803 V6.0.0, 3$^{rd}$ Generation Partnership Project; Technical Specification Group Services and System Aspects; S-CCPCH performance for Multimedia Broadcast/Multicast Service (MBMS) (Release 6) (Sep. 2005).

3GPP TS 22.246 V7.1.0, 3$^{rd}$ Generation Partnership Project; Technical Specification Group Services and System Aspects; Multimedia Broadcast/Multicast Service (MBMS) user services; Stage 1 (Release 7) (Jun. 2006).

3GPP TS 26.346 V6.7.0, 3$^{rd}$ Generation Partnership Project; Technical Specification Group Services and System Aspects; Multimedia Broadcast/Multicast Service (MBMS); Protocols and codecs (Release 6) (Dec. 2006).

3GPP TR 26.946 V6.1.0, 3$^{rd}$ Generation Partnership Project; Technical Specification Group Services and System Aspects; Multimedia Broadcast/Multicast Service (MBMS) user service guidelines (Release 6) (Sep. 2006).

3GPP TS 33.246 V6.9.0, 3$^{rd}$ Generation Partnership Project; Technical Specification Group Services and System Aspects; 3G Security; Security of Multimedia Broadcast/Multicast Services (MBMS) (Release 6) (Dec. 2006).

3GPP TS 32.273 V.6.60, 3$^{rd}$ Generation Partnership Project; Technical Specification Group Services and System Aspects; Telecommunication management; Charging management; Multimedia Broadcast and Multicast Service (MBMS) charging (Release 6) (Dec. 2006).

OMA PoC Control Plane, Open Mobile Alliance, OMA-TS-PoC_ControlPlane-V2_0-20071112-D, Open Mobile Alliance Ltd. 2007.

* cited by examiner

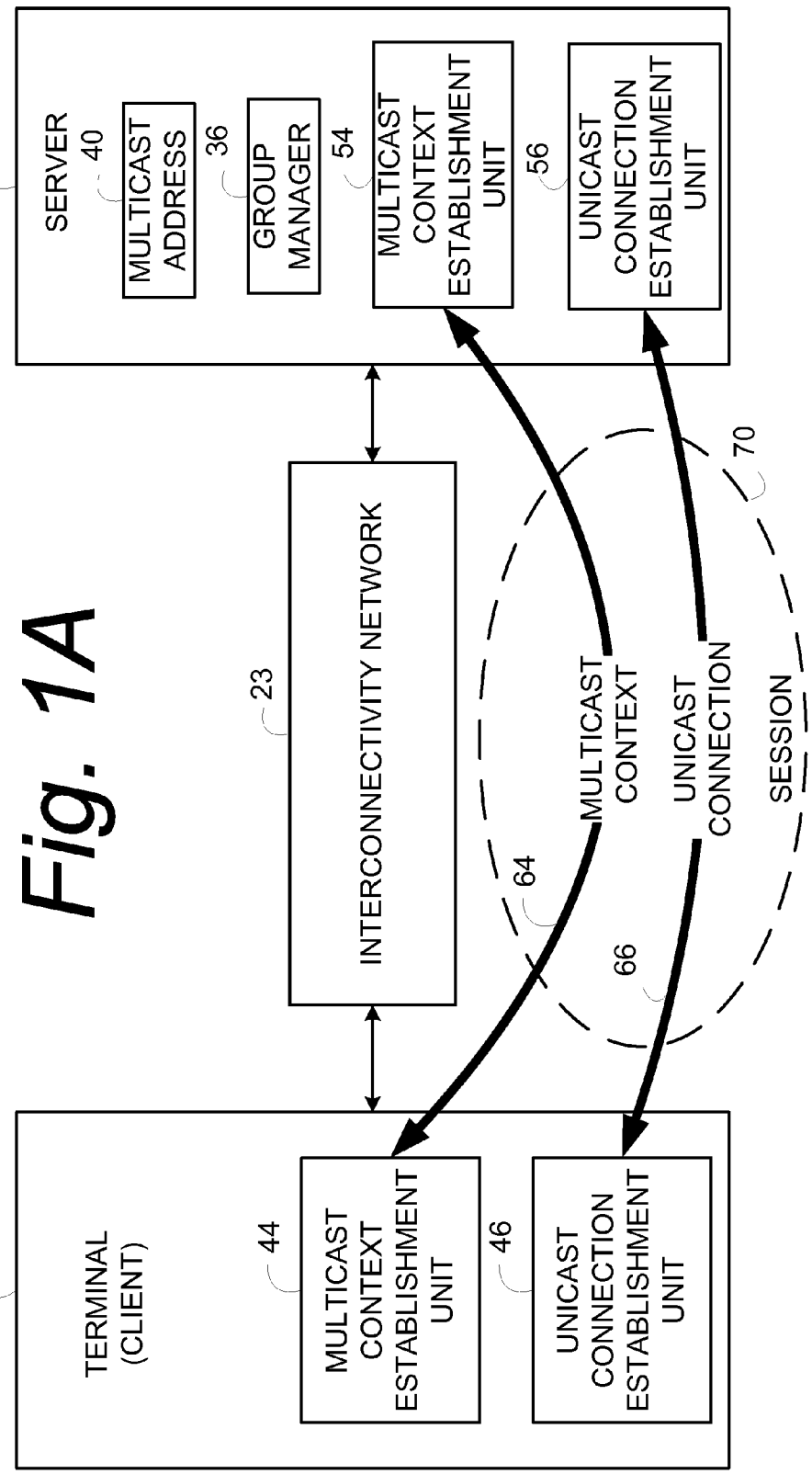

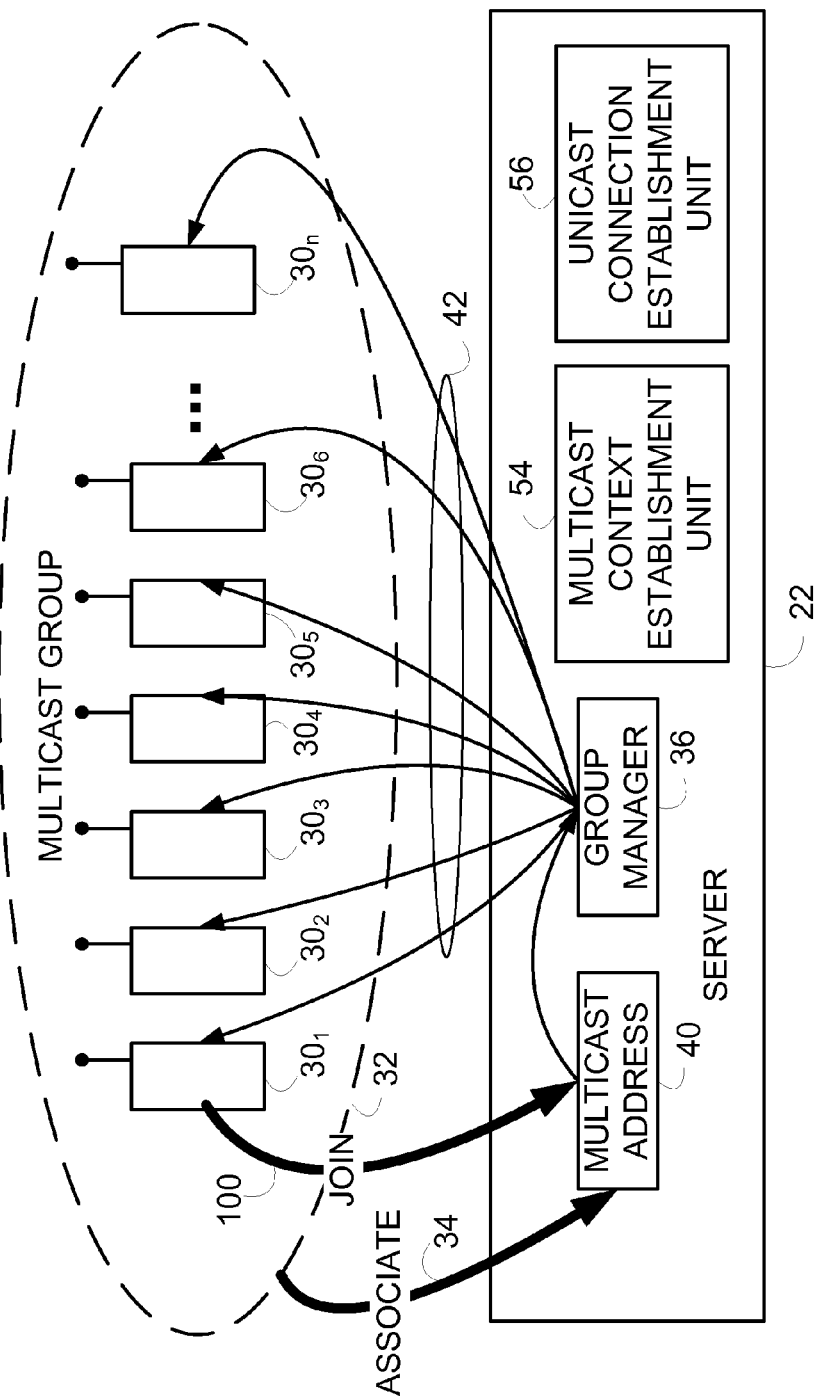

MULTICAST PUSH TO TALK GROUPS, APPARATUS, AND METHODS

BACKGROUND

I. Technical Field

This invention relates to telecommunications, and particularly to multicasting to/with a group of participants.

II. Related Art and Other Considerations

Public safety telecommunications systems have historically existed as dedicated systems which are especially designed for a specific use. As such, typical public safety telecommunications systems have rather peculiar or unique requirements.

Few public safety telecommunications standards currently exist. For example, TErrestrial Trunked RAdio (TETRA) is an open digital trunked radio standard which is defined by the European Telecommunications Standardization Institute (ETSI). Another example is Project 25, a steering committee for selecting voluntary common system standards for digital public safety radio communications. Yet there is no single commonly used standard that dominates the market place. Thus, it is still fair to say that the market for public safety telecommunications is fragmented from a technological and standard point of view. This fragmentation and the relatively small market size of any system have made public safety technology either expensive or shallow in functionality.

Attempts have been made to enable the public safety market to re-use the benefits of (among other technologies) the evolution of the Global System for Mobile Communications (GSM). In addition, the advent of new multi-media enabled networks and new developments in radio access and terminals brings other possibilities. Further, advancements in core networks, radio access and terminals make it continuously easier to offer public safety systems based on main-stream mobile technology.

Push-to-Talk over Cellular (PoC) is a communication service that provides wireless users with a virtually instantaneous method of connecting to other users, with just a push of a button. Push-to-Talk over Cellular (PoC) service is half-duplex, and can be used for person-to-person calls as well as for group communication over cellular networks like GSM, WCDMA or CDMA2000 networks. Push-to-Talk over Cellular (PoC) service thus resembles its predecessor Push-to-Talk (PTT) [also known as "Press-to-Transmit"] in using a momentary button to switch from voice reception mode to transmit mode. As such, Push to Talk over Cellular (PoC) is a walkie-talkie type service that provided over a cellular phone network. A push to talk connection is typically connected virtually instantaneously. A single press reaches an active talk group. Users no longer need to make several calls to coordinate with a group.

There are proprietary implementations of PoC. In addition, the Open Mobile Alliance (OMA) has defined standards for PoC Push-to-Talk over Cellular (PoC). See, for example, Push to Talk over Cellular (PoC)—Architecture, draft version 2.0—March 2007, Open Mobile Alliance, OMA-AD_PoC-V2_0-20070326-D, which is incorporated herein by reference. The OMA PoC specifications set utilize a number of existing specifications from IETF, 3GPP and 3GPP2, including the capabilities of the 3GPP IP Multimedia Subsystem (IMS) and 3GPP2 Multimedia Domain (MMD) to enable IP connectivity and IP based communication between mobile devices.

PoC or a similar IP based push-to-talk based system is proposed to be part of future public safety capabilities. Yet there are problems in making efficient push-to-talk group sessions over radio accesses like GSM/EDGE or WCDMA.

PoC or a similar IP based push-to-talk based system as known today utilizes unicast IP bearers for group communication. A radio bearer is a service provided by Layer 2 for the transfer of user data between a wireless terminal such as a user equipment unit and a radio access network (RAN) [such as a UMTS Terrestrial Radio Access Network]. Use of unicast IP bearers limits the maximum number of PoC Users that can participate in one cell. For example a radio bearer realization over a unicast EDGE (Enhanced Data GSM Environment) radio network may provide ten to twenty simultaneous media bursts comprising voice (voice users in a group) per carrier and cell (assuming that header compression is deployed).

By contrast, public safety telecommunication services on the other hand face challenging requirements with very large PoC Groups that must be supported. A real-life scenario that dramatizes the requirements on PoC Group size occurred in the year 2004 at a fire at the N.P. Johnsen fireworks factory in Denmark. The catastrophe summoned eight hundred responders; approximately half were active. Presently it is not feasible to efficiently support hundreds of simultaneous users (e.g., first responders) using unicast IP bearers in existing radio access technologies.

Some public safety applications have requirements on "unlimited" cell capacity to handle situations at emergency areas where several hundreds of people may need to communicate. To be able to support a large amount of simultaneous users (like first responders in the firework plant fire disaster), some sort of multicasting appears necessary. A multicasting approach referred to as Multimedia Broadcast Multicast Service (MBMS) is being standardized by the Third Generation Partnership Project (3GPP). Multimedia Broadcast Multicast Service (MBMS) is a broadcasting service that can be offered via existing GSM and UMTS cellular networks. The MBMS feature is split into the MBMS Bearer Service and the MBMS User Service. The MBMS Bearer Service includes a Multicast and a Broadcast Mode. The MBMS Bearer Service uses IP Multicast addresses for the IP flows. The MBMS User Service is basically the MBMS Service Layer and offers an Streaming and a Download Delivery Method. 3GPP standards relating to Multimedia Broadcast Multicast Service (MBMS) include the following (all of which are incorporated herein by reference):

3GPP TS 22.146 Multimedia Broadcast/Multicast Service (MBMS); Stage 1

3GPP TS 23.246 Multimedia Broadcast/Multicast Service (MBMS); Architecture and functional description.

3GPP TS 25.346 Introduction of the Multimedia Broadcast/Multicast Service (MBMS) in the Radio Access Network (RAN); Stage 2.

3GPP TS 43.246 Multimedia Broadcast/Multicast Service (MBMS) in the GERAN; Stage 2.

3GPP TR 25.803 S-CCPCH performance for Multimedia Broadcast/Multicast Service (MBMS).

3GPP TS 22.246 Multimedia Broadcast/Multicast Service (MBMS) user services; Stage 1.

3GPP TS 26.346 Multimedia Broadcast/Multicast Service (MBMS); Protocols and codecs.

3GPP TR 26.946 Multimedia Broadcast/Multicast Service (MBMS) user service guidelines.

3GPP TS 33.246 3G Security; Security of Multimedia Broadcast/Multicast Service (MBMS).

3GPP TS 32.273 Telecommunication management; Charging management; Multimedia Broadcast and Multicast Service (MBMS) charging.

However, the pure MBMS concept has been formulated from the perspective of a broadcast type of services, such as television, for example. Broadcast services differ in several respects from multicast services. What is needed, therefore, and an object of the present invention, is a technique for providing multicasting services for terminals with push to talk over cellular type capabilities.

SUMMARY

The technology includes using multicast bearers (e.g., Internet Protocol bearers) for push to talk multicast groups. Whereas the state of the art push to talk over cellular (PoC) solutions do not support the use of such multicast bearers, the present technology incorporates multicast into push to talk multicast of media bursts.

In one of its several aspects the technology involves associating a multicast address to a multicast group when the group is created. This multicast address is provisioned to the users in the group (e.g., to the terminals of the users of the group). In an example implementation, the multicast address is provisioned using Session Initiation Protocol (SIP) event packages prior to session set-up. The Session Initiation Protocol (SIP) is an application-layer control (signaling) protocol for creating, modifying, and terminating sessions with one or more participants. These session s include Internet telephone calls, multimedia distribution, and multimedia conferences, for examples. Provisioning users in the group using SIP event packages prior to session set-up means that multicast groups must be pre-arranged groups or chat groups, i.e. groups that are managed by a server and/or XML Document Management (XDM).

According to one example aspect of the technology, a terminal (such as that belonging to or carried by an emergency first responder, for example) participates in a push to talk multicast group in either of two modes or levels. In a first mode or first level of participation, the terminal can join a multicast address for the push to talk multicast group as a passive recipient of transmissions and can thereby listen to the multicast address. In a second mode or second level of participation, the terminal becomes an active participant in the push to talk session. As an active participant in the push to talk session, the terminal can, e.g., receive sender identification (e.g., identification of other participants who may be talking in the push to talk multicast group) and send media bursts to the multicast group.

In an example embodiment, the terminal comprises both a multicast context establishment unit and a unicast connection establishment unit. The multicast context establishment unit is configured to enable the terminal to join a multicast address for the multicast group and to establish a PDP context whereby the terminal can join the multicast address as a passive recipient of transmissions of the multicast group. The unicast connection establishment unit is configured to establish a unicast connection between a server which hosts the push to talk multicast group and the terminal and thereby facilitate active participation of the terminal in the push to talk session for the multicast group.

In an example implementation, terminal further comprises a subscription unit configured to obtain push to talk multicast group information needed to enable the terminal to join the multicast address for the multicast group. For example, the push to talk multicast group information comprises the multicast address for the push to talk multicast group and preferably plural ones of the following: name of the push to talk multicast group; a type of the push to talk multicast group; an indication of when to join the multicast address.

Another aspect of the technology involves a method of operating a telecommunications system. In an example mode, the method of operation includes basic actions of (a) providing a terminal with push to talk multicast group information; (b) enabling the terminal to join a multicast address for the multicast group; and (c) establishing a unicast connection with the terminal, and thereby facilitating active participation of the terminal in a push to talk session. In an example implementation, act (c) comprises establishing the unicast connection with the terminal to facilitate transmission of media bursts in an uplink direction from the terminal.

The time for the terminal to join a multicast address can be configured or otherwise provided or arranged. In one example alternative implementation, the time to join the multicast address may be substantially immediately at reception by the terminal of the push to talk group information. In other words, joining of the multicast address (as a passive participant/listener) for the multicast group is permitted after receipt of the push to talk multicast group information. Thereafter the terminal can either request or be invited to join (as an active participant) the push to talk session for the push to talk multicast group. For example, a server may send the terminal an invitation for active participation in the push to talk session.

In one example alternative implementation, the time to join the multicast address may not be before the unicast connection is established. In other words, the terminal joining the multicast address for the multicast group cannot occur before the unicast connection with the terminal is established. The act of establishing the unicast connection between a server hosting the push to talk multicast group and the terminal can be either by the terminal initiating the establishing of the unicast connection, or by the server inviting the terminal to join the push to talk session.

The method is also susceptible to various optional augmentations and variations. For example, the method can further comprise apprising the terminal when to join the multicast address. In other words, the method can include the server advising the terminal whether the terminal is to join the multicast address either substantially immediately at reception by the terminal of the push to talk group information, or upon joining the push to talk session.

As another example augmentation and/or variation, in an example implementation, the method further comprises configuring or provisioning the terminal with a multicast group address to which the terminal sends a subscribe request to a server. Once contacted at the server's multicast group address, the server sends the push to talk multicast group information to the terminal.

As yet another example augmentation and/or variation, the method can further comprise providing the terminal with the push to talk multicast group information for plural multicast groups. The terminal is thus able to participate either concurrently or sequentially in plural multicast groups.

Another aspect of the technology concerns a server for hosting communications among a push to talk multicast group. In an example implementation, the server comprises both a multicast context establishment unit and a unicast connection establishment unit. The multicast context establishment unit is configured to enable a terminal to join a multicast address for the multicast group and to establish a PDP context whereby the terminal can join the multicast address as a passive recipient of transmissions of the multicast group. The unicast connection establishment unit is configured to establish a unicast connection between the server and the terminal and thereby facilitate active participation of the terminal in the push to talk session for the multicast group.

The technology is particularly but not exclusively applicable to push to talk over cellular (PoC) wherein the terminal is a wireless terminal.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1A is a diagrammatic view of an example embodiment of a telecommunications system configured to support a push to talk multicast group.

FIG. 2 is a diagrammatic view of an example push to talk multicast group associated with a multicast address.

DETAILED DESCRIPTION

Figure 1B:
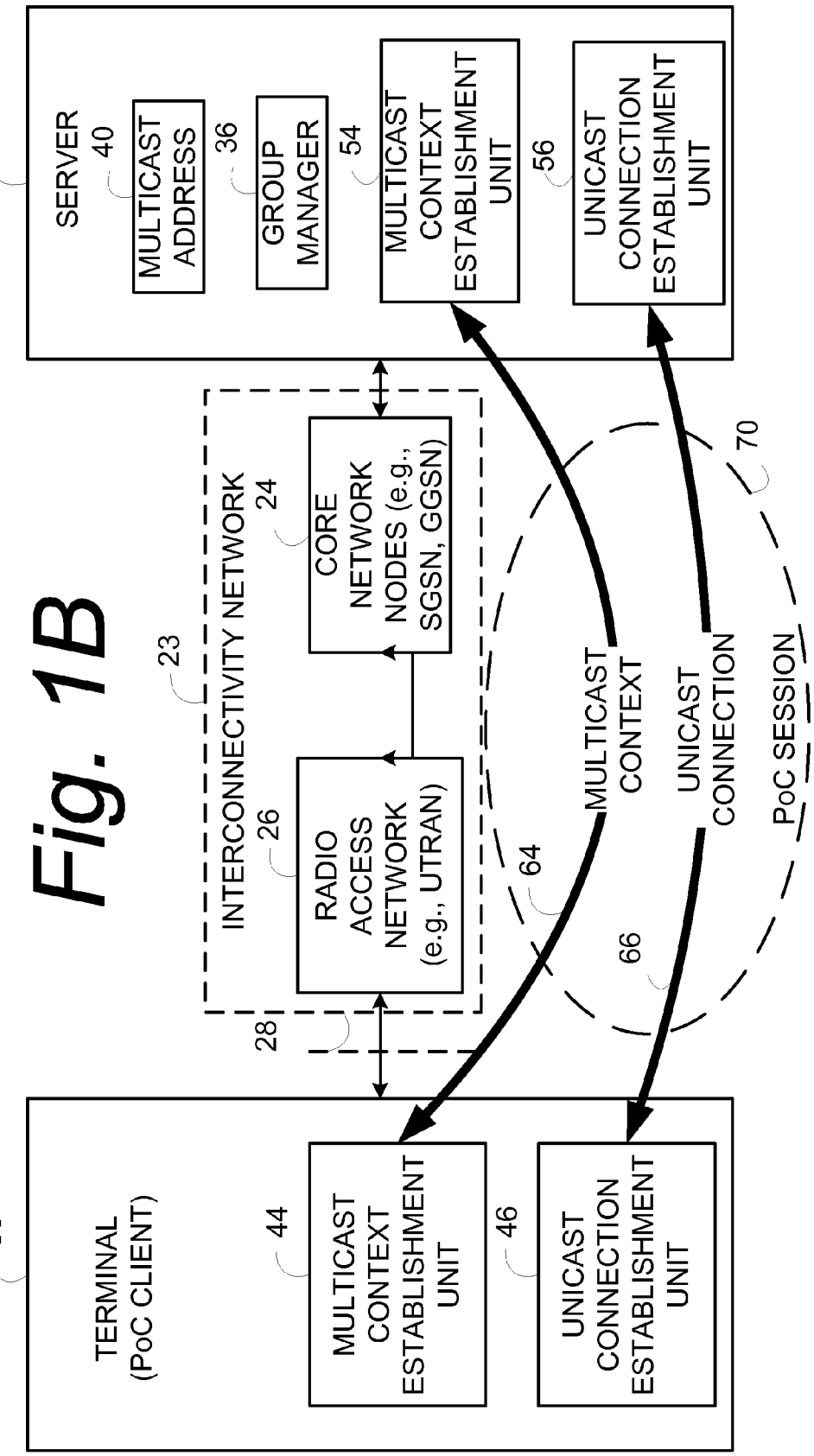
FIG. 1B is a diagrammatic view of an example embodiment of a telecommunications system configured to support a push to talk over cellular (PoC) multicast group.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

FIG. 1A shows a non-limiting example telecommunications system 20 of a type wherein the present technology can be advantageously employed. The example telecommunications system 20 includes a server 22 which provides one or more multicasting services or hosts one or more sources of multicasting media to/for, e.g., subscribing units. The server 22 is connected via a connectivity network 23 to plural terminals 30. The connectivity network 23 can comprise any suitable network, such as the Internet, a wide area network (WAN), local area network (LAN), or (as hereinafter further discussed) a radio access network (RAN)

Although FIG. 1A shows one terminal 30, and although much of the description herein pertains to operation of one terminal 30, it should be kept in mind the technology pertains to multicasting of media to plural (and potentially to several hundred or more) terminals. Accordingly, FIG. 2 shows an example push to talk multicast group 32 comprising terminals $30_1$ through $30_n$. The push to talk multicast group 32 can be defined and managed by a group manager 36. Multicast groups such as multicast group 32 should be pre-arranged groups or chat groups, e.g., groups that are managed by XML Document Management (XDM).

In a pre-arranged group, when a session is initiated members in the group are invited and other members may join or be added later. In the scenarios described herein, invited members are those who are supposed to join immediately. When a chat group session is initiated, no one is invited. All members of the group must join when needed. For example, some one may initiate the chat group session and others may join (because they want to say something), and other users may without joining listen to the multicast address.

In one of its several aspects the technology described herein involves associating (as depicted by arrow 34) a multicast address 40 (such as a multicast IP address) to a multicast group such as push to talk multicast group 32 when the group is created. As further shown by an example implementation in FIG. 2, the multicast address 40 and group manager 36 can be hosted by an entity such as server 22. This multicast address 40 is provisioned to the users in the group (e.g., to the terminals $30_1$-$30_n$ of the users of the group 32). In the example implementation, and as depicted by arrows 42, the multicast address 40 is provisioned or supplied by, e.g., group manager 36, to the terminals $30_1$-$30_n$ of the users of the group 32. The multicast address 40 can be provisioned using Session Initiation Protocol (SIP) event packages prior to Session set-up. The Session Initiation Protocol (SIP) is an application-layer control (signaling) protocol for creating, modifying, and terminating sessions with one or more participants. These sessions include Internet telephone calls, multimedia distribution, and multimedia conferences, for examples. Provisioning users in the group using SIP event packages prior to Session set-up means that multicast groups must be pre-arranged groups or chat groups, e.g., groups that are managed by a server 22 (and/or XML Document Management (XDM)).

Thus, the terminal 30 (such as that belonging to or carried by an emergency first responder, for example) participates in a push to talk multicast group 32, and can do so in either of two modes or levels of participation. In a first mode or first level of participation, the terminal 30 can join the multicast address 40 for the push to talk multicast group 32 as a passive recipient of transmissions, and can thereby listen to the multicast address 40. In a second mode or second level of participation, the terminal 30 becomes an active participant in the push to talk session for the push to talk multicast group 32. As an active participant in the push to talk session, the terminal 30 can, e.g., receive sender identification (e.g., identification of other participants who may be talking in the push to talk multicast group) and send media bursts to the multicast group 32.

In an example embodiment, and as shown in FIG. 1A, the terminal 30 comprises both a multicast context establishment unit 44 and a unicast connection establishment unit 46. Similarly, server 22 comprises both a multicast context establishment unit 54 and a unicast connection establishment unit 56. The multicast context establishment unit 44 of terminal 30 and the unicast connection establishment unit 54 of server 22 are each configured to enable the terminal 30 to join the multicast address 40 for the multicast group 32 and to establish a PDP (multicast) context 64. The unicast connection establishment unit 46 of terminal 30 and the unicast connection establishment unit 56 of server 22 are each configured to establish a unicast connection 66 between the server 22 (which hosts the push to talk multicast group 32) and the terminal 30. When a terminal joints the multicast address and participates only in the PDP (multicast) context 64, the terminal 30 can be no more than a passive recipient of transmissions of the multicast group 32. When the terminal 30 has both the PDP (multicast) context 64 and the unicast connection 66, the terminal 30 can be an active participant in the session for the push to talk multicast group. Since the push to talk session involves both the PDP (multicast) context 64 and the unicast connection 66, the push to talk session is depicted by circle 70 in FIG. 1A.

Figure 3A:
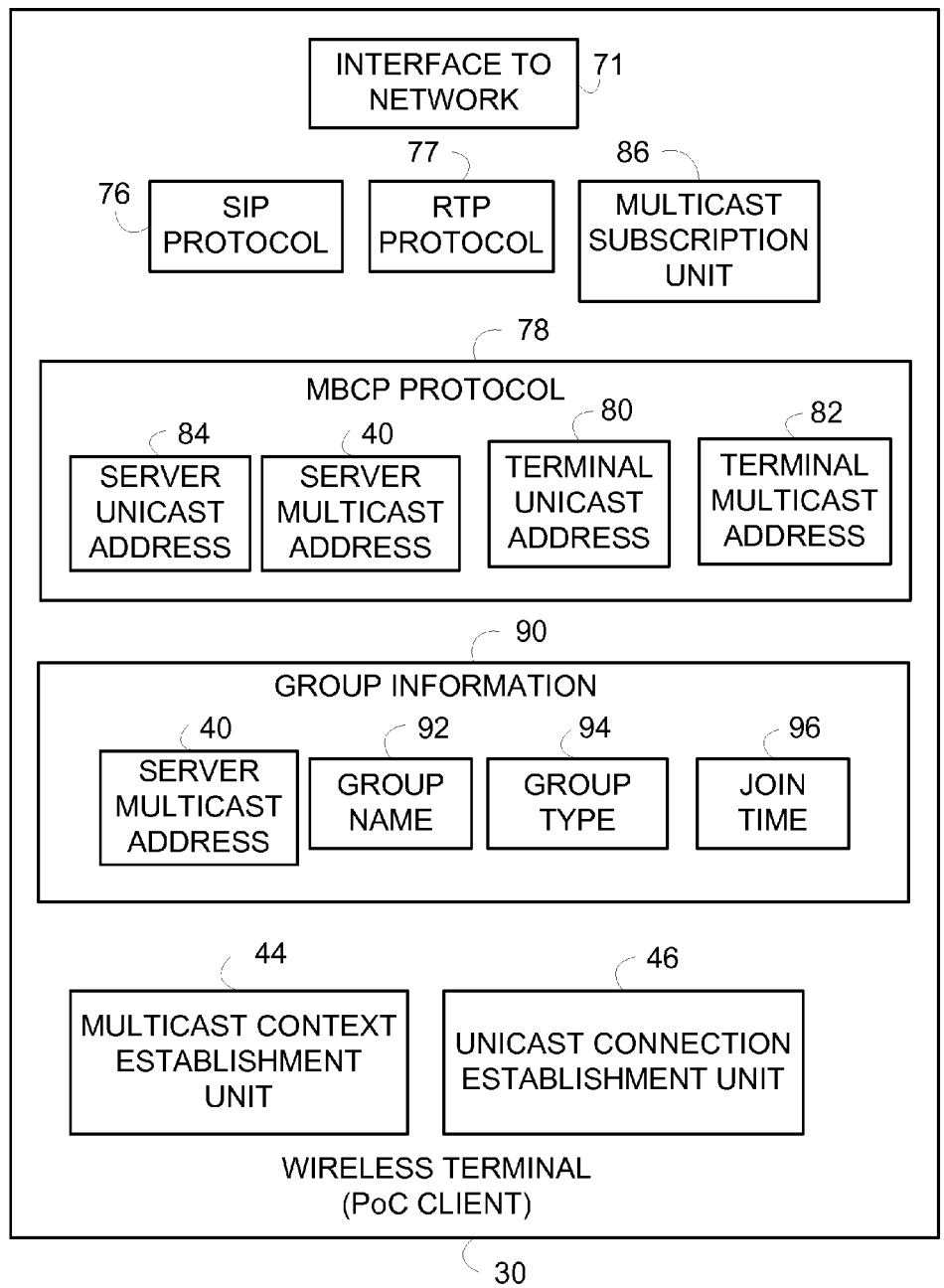
FIG. 3A is a diagrammatic view of an example embodiment of a terminal capable of belonging to a push to talk multicast group.

Further details of an example embodiment of terminal 30 are shown in FIG. 3A. FIG. 3A illustrates terminal 30 as further comprising network interface 71 and various protocol handlers/protocol stacks. The protocol handler(s) are for protocols such as Session Initiation Protocol (SIP) 76; Real Time Protocol (RTP) 77; and Media Burst Control Protocol (MBCP) 78. The Media Burst Control Protocol (MBCP) 78 includes memory or storage locations for several addresses, including terminal unicast address 80; terminal multicast address 82; a memory location 84 for server unicast address; and a memory location for server multicast address 40.

In addition to the foregoing, as an optional feature the terminal 30 can further include multicast subscription unit 86. The multicast subscription unit 86 is configured to obtain push to talk multicast group information 90 needed to enable the terminal 30 to join the multicast address 40 for the multicast group 32. For example, the push to talk multicast group information 90 comprises the multicast address 40 for the push to talk multicast group and preferably plural ones of the following: group name 92 (e.g., name of the push to talk multicast group); group type 94 (e.g., a type of the push to talk multicast group); and, join time 96 (e.g., an indication of when to join the multicast address). The multicast group information 90 can also contain other information elements or parameters, such as priority information.

Priority information is beneficial in a case in which a terminal/client can listen to more than one multicast address, e.g., to more than one multicast session. In such case, the terminal/client should know if there is a need to prioritize media from one or the other session. As long as no media is received for one session it is permissible to play out the media from any other session. However, as soon as media is received from a particular session (indicated by the priority information to be a priority session), the media from that priority session is played out to the user in preference over other session(s). In push to talk over cellular (PoC) the descriptors "primary" and "secondary can be used as possible priority designators for the priority information. However, in other implementations more than two priority classes can be used and expressed by the priority information.

It will be appreciated that the units or functionalities comprising or constituting terminal 30 and particularly the multicast context establishment unit 44 and the unicast connection establishment unit 46 of the terminal 30, and the various protocol handlers such as handlers for Session Initiation Protocol (SIP) 76, Real Time Protocol (RTP) 77, and Media Burst Control Protocol (MBCP) 78 can be realized by a processor or controller as those terms are expansively explained above. Similarly, the units or functionalities comprising or constituting server 22 and particularly the multicast context establishment unit 54, the unicast connection establishment unit 56, and the group manager 36 of server 22 can be realized by a processor or controller as those terms are expansively explained above.

Another aspect of the technology involves a method of operating a telecommunications system such as the example telecommunications system 20 of FIG. 1A. In an example mode, the method of operation includes basic actions such as those generically depicted in FIG. 4. The basic actions, steps, or events include act 4-1; act 4-2; and act 4-3. Act 4-1 comprises providing a terminal 30 with push to talk multicast group information (such as one or more of the group information items 90 shown in FIG. 3B, and particularly including multicast address 40). Act 4-2 comprises enabling the terminal to join a multicast address for the multicast group. For example, arrow 100 in FIG. 2 shows terminals $30_1$ joining multicast address 40 for multicast group 32, and arrow 64 of FIG. 1A shows the multicast context that ensues upon joining of multicast address 40. Act 4-3 comprises establishing a unicast connection with the terminal, and thereby facilitating active participation of the terminal in a push to talk session. In an example implementation, act 4-3 comprises establishing the unicast connection with the terminal to facilitate transmission of media bursts in an uplink direction from the terminal. An example of act 4-3 is illustrated in FIG. 1A by arrow 66 which depicts the unicast connection.

The time for terminal 30 to join multicast address 40 can be configured or otherwise provided or arranged. For example, the join time 96 included in the multicast group information 90 supplied by server 22 to terminal 30 can include an indication of when the terminal 30 is to join multicast address 40. For example, the information specified by the information of join time 96 can specify either (1) the terminal is to join the multicast address substantially immediately upon reception by the terminal of the push to talk group information, or (2) the terminal is to join the multicast address 40 upon joining the push to talk session 70.

Figure 3B:
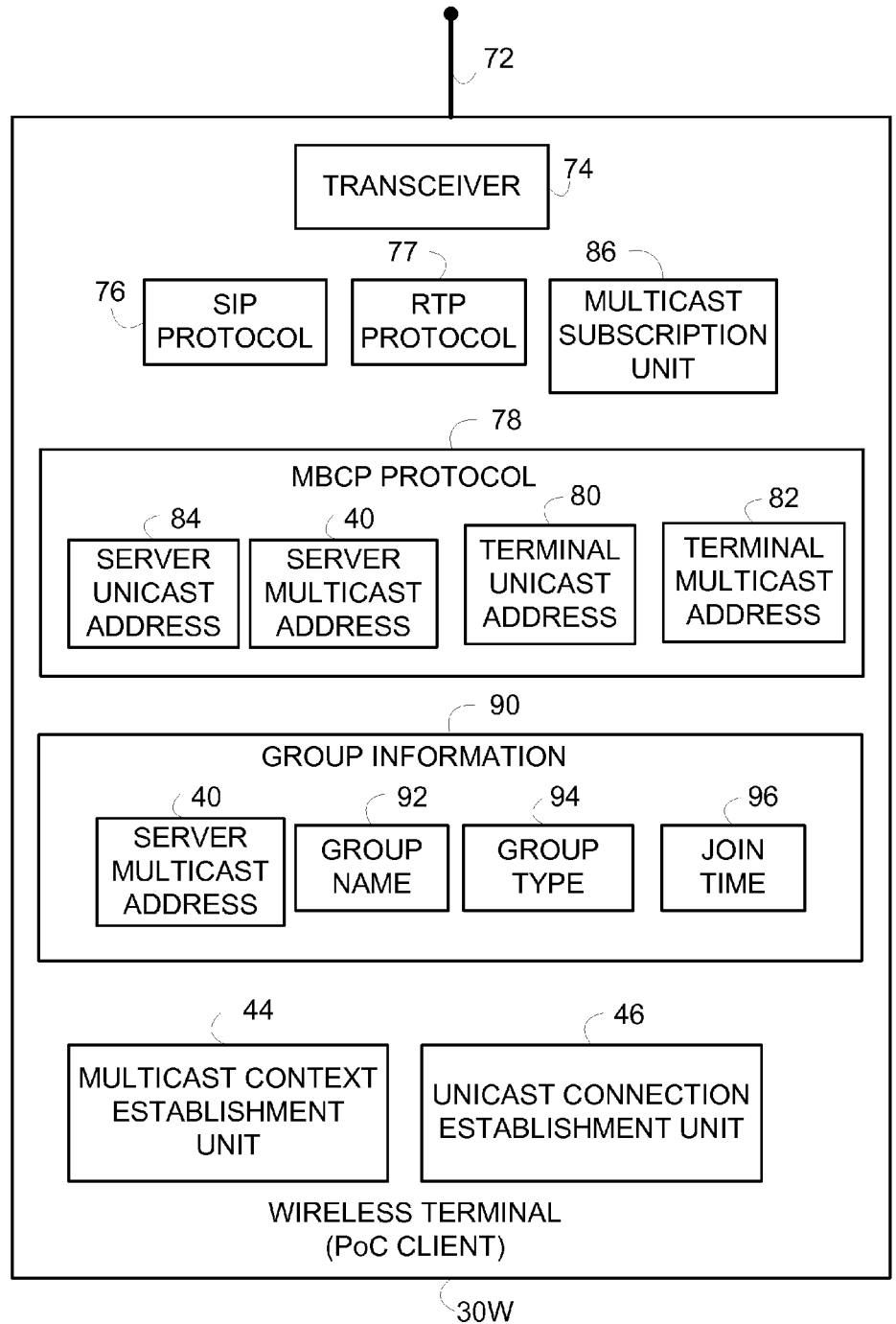
FIG. 3B is a diagrammatic view of an example embodiment of a terminal capable of belonging to a push to talk over cellular (PoC) multicast group
Figure 4:
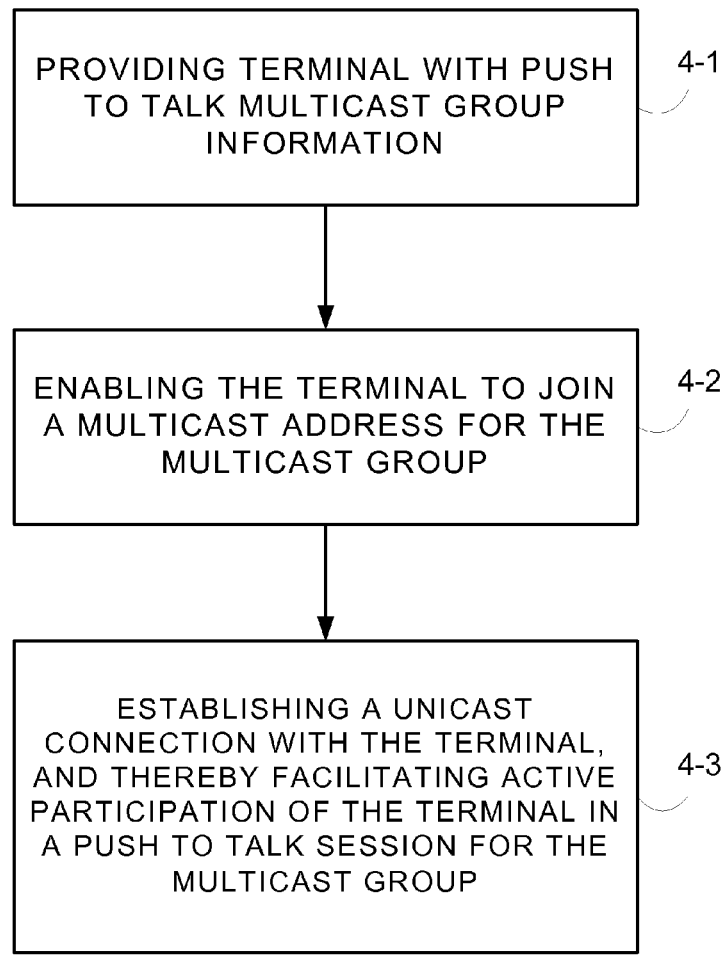
FIG. 4 is a flowchart showing basic example acts involved in a method of operating a telecommunications system catering to push to talk multicast groups.

FIG. 1B illustrates how the technology can be utilized for a push to talk over cellular (PoC) multicast group 32, e.g., how the technology can be used for wireless terminals such as wireless terminal 30W shown in FIG. 3B. For a cellular implementation, the connectivity network 23 can take the form of a core network 24 and a radio access network (RAN) 26. A wireless terminal 30W for use in a wireless/cellular application is shown in FIG. 3B. The wireless terminal 30W of FIG. 3B primarily differs from the generic terminal 30 of FIG. 3B by having antenna 72 and transceiver 74 in lieu of network interface 71.

In the FIG. 1B cellular implementation server 22 can comprise or be connected to a core network 24. For sake of wireless subscribers, the core network is in turn connected to a radio access network (RAN) 26. The radio access network (RAN) 26 can communicate over a radio or air interface 28 with wireless subscribers, e.g., wireless terminals, such as the one representative, example wireless terminal 30 shown in FIG. 1B.

As depicted in FIG. 1B, the core network 24 (which can be a GPRS core network, for example) can include nodes such as a SGSN node and a Gateway GPRS Support Node (GGSN) node. To the extent here relevant, the core network 24 provides mobility management, session management, and transport for packet services (e.g., Internet Protocol (IP) packet services). The core network 24 can be connected to server 22 and/or a packet switched network through the GGSN node. The GGSN is a router which detunnels user data from a tunnel protocol and sends out normal user data IP packets. The SGSN node performs, e.g., interworking with the connected radio access network 26.

The radio access network (RAN) 26 can be structured and operated according to any suitable radio access technology. In a non-limiting example, radio access network (RAN) 26 is a Universal Mobile Telecommunications (UMTS) Terrestrial Radio Access Network (UTRAN). The UTRAN is a third generation system which is in some respects builds upon the radio access technology known as Global System for Mobile communications (GSM) developed in Europe. The radio access network (RAN) typically covers a geographical area which is divided into cell areas, with each cell area being served by a base station, e.g., a radio base station or (in UTRAN parlance) "NodeB" (the terms such as radio base station and NodeB being used interchangeably herein). A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto.

The wireless terminals are often called user equipments or "UEs" for short (in UTRAN). The wireless terminals can be mobile stations such as mobile telephones ("cellular" telephones) and laptops with mobile termination, and thus can be, for example, portable, pocket, hand-held, computer-included, or car-mounted mobile devices which communicate voice and/or data with radio access network. The wireless terminals can also be fixed terminals that have wireless transmission and reception capabilities.

It should thus be understood that the technology described herein is generically applicable to terminals whether they are wireless terminals such as terminal 30W or wired terminals, e.g., whether the push to talk multicast group is a push to talk over cellular (PoC) multicast group or not. For sake of simplification, the ensuing examples are discussed as if the implementation were wireless/cellular, e.g., involving a push to talk over cellular (PoC) multicast group. However, it should be appreciated that both wireless and wired implementations are encompassed. To this end, hereafter the terminal is referred to as wireless terminal 30.

As mentioned above, a first possible time to join the multicast address may be substantially immediately at reception by the wireless terminal of the push to talk over cellular (PoC) group information. In other words, joining of the multicast address 40 (as a passive participant/listener) for the PoC multicast group is permitted after receipt of the push to talk over cellular (PoC) multicast group information. Thereafter the wireless terminal can either request or be invited to join (as an active participant) the push to talk over cellular (PoC) session for the push to talk over cellular (PoC) multicast group. For example, a server may send the wireless terminal an invitation for active participation in the push to talk over cellular (PoC) session.

Figure 5:
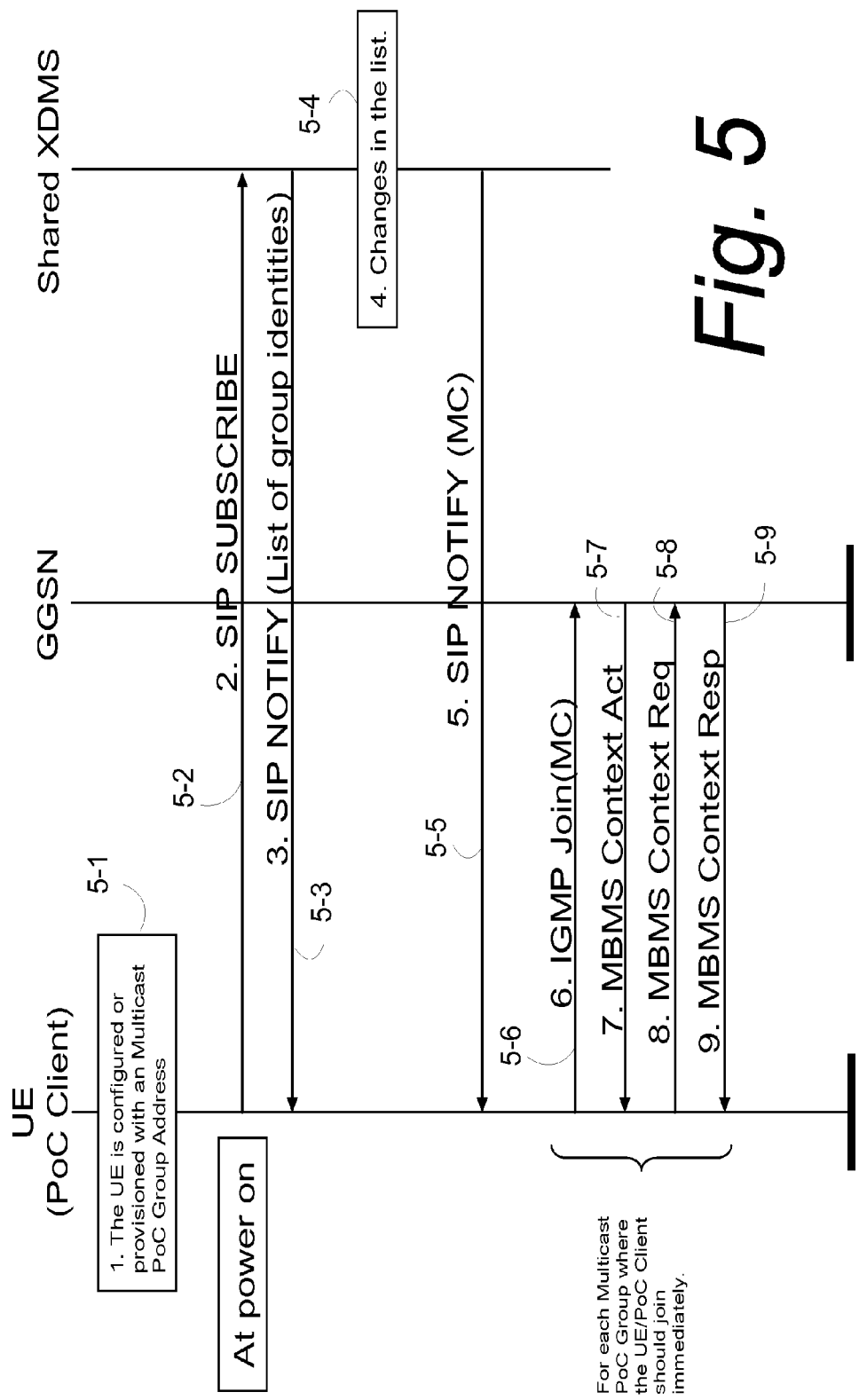
FIG. 5 shows representative example acts involved in, e.g., a wireless terminal obtaining a multicast address for a push to talk over cellular (PoC) multicast group, and thereafter, joining the multicast address for the push to talk over cellular (PoC) multicast group.

FIG. 5 shows representative example acts involved in, e.g., a wireless terminal obtaining a multicast address for a push to talk over cellular (PoC) multicast group, and thereafter joining the multicast address for the push to talk over cellular (PoC) multicast group. Act 5-1 comprises the wireless terminal 30 (also known as the "UE" and "PoC Client") being configured or provisioned with one or more addresses where to subscribe to the list of Multicast PoC Groups. At power on, as act 5-2 the wireless terminal sends a SUBSCRIBE request to a server in the network, e.g., server 22. The server 22 can be a Shared XML Document Management (XDM) Server as illustrated in FIG. 5 (which, e.g., stores Group information in the OMA architecture) or a dedicated push to talk over cellular (PoC) multicast server. As act 5-3, the server 22 returns a list of Multicast PoC Groups using, e.g., a SIP NOTIFY request message. Act 5-3 thus illustrates that the multicast address (and one or more other information elements of multicast group information 90) can be provisioned using Session Initiation Protocol (SIP) event packages prior to PoC Session set-up.

Figure 6:
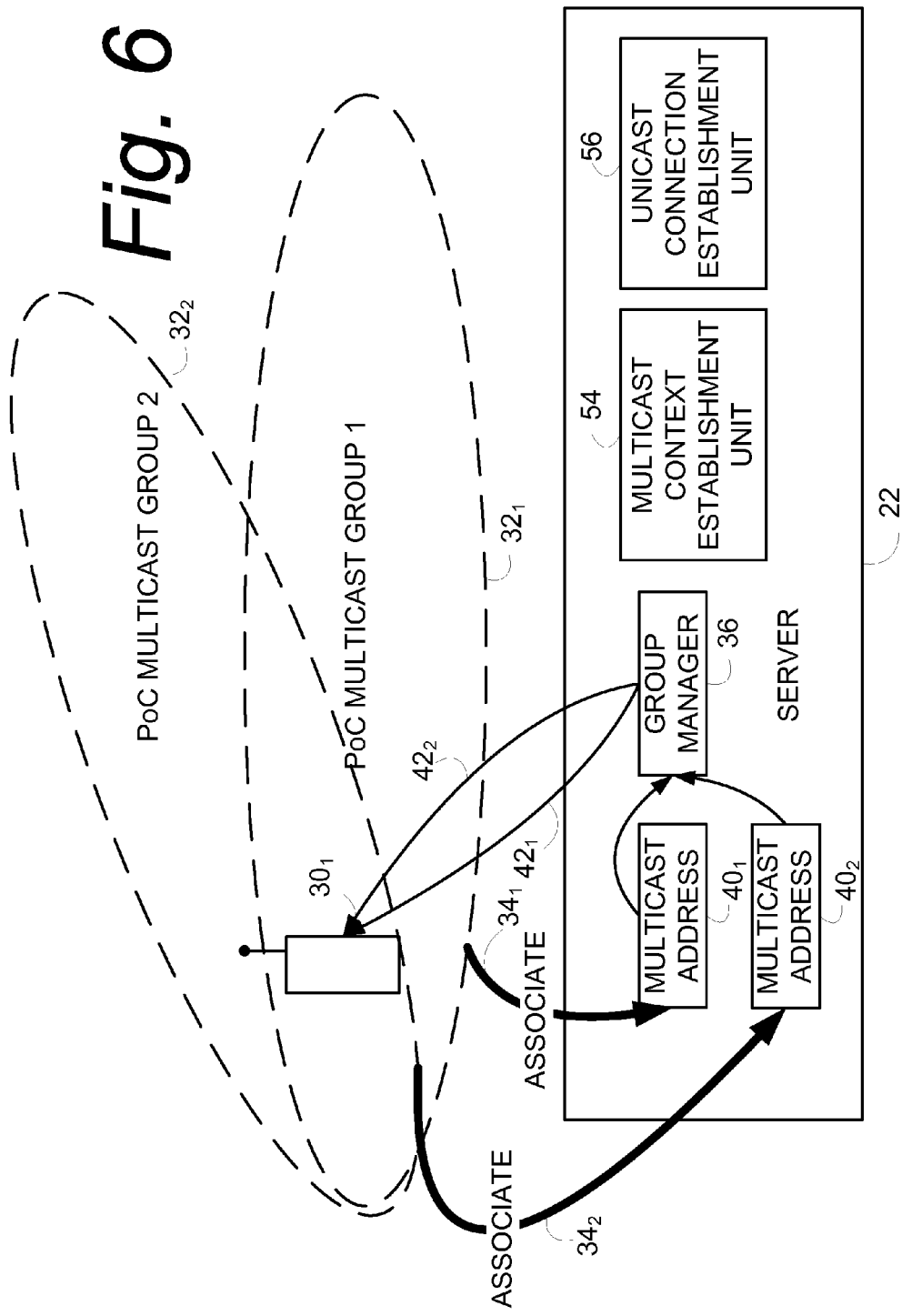
FIG. 6 is a diagrammatic view showing a terminal being a member of plural push to talk multicast groups.

In an example augmentation and/or variation, the method can further comprise providing the wireless terminal with the push to talk over cellular (PoC) multicast group information for plural multicast groups. For example, FIG. 6 shows two multicast groups, e.g., multicast group $32_1$ and multicast group $32_2$. The first multicast group $32_1$ is associated with multicast address $40_1$ (the first association being depicted by arrow $34_1$), while the second multicast group $32_2$ is associated with multicast address $40_2$ (the second association being depicted by arrow $34_2$). Assuming that wireless terminal $30_1$ is to belong to both first multicast group $32_1$ and second multicast group $32_2$, arrow $42_1$ represents wireless terminal $30_1$ being supplied with the multicast group information for first multicast group $32_1$ (including the multicast address $40_1$)

and arrow 42₂ represents wireless terminal 30₁ being supplied with the multicast group information for second multicast group 32₂ (including the multicast address 40₂). The arrow 42₁ and arrow 42₂ may be separate messages, but preferably the information represented thereby is consolidated into a single message such as that of act 5-3, e.g., a SIP NOTIFY message that includes a list of group identities. Thus, it will be appreciated that a wireless terminal can be a member or candidate for participation in one, two, or more (e.g., plural) push to talk over cellular (PoC) multicast groups. The wireless terminal is thus able to participate either concurrently or sequentially in plural multicast groups.

As previously stated, act 5-3 can depict return to the wireless terminal not only of multicast address 40, but one or more other information elements of multicast group information 90. As illustrated in FIG. 3B, for each of the one or plural multicast groups to which the wireless terminal 30 belongs or is to belong, the information elements of multicast group information 90 can include one or more of the following: (1) name of the PoC multicast group; (2) multicast address; (3) type of PoC multicast group (pre-arranged PoC Group or chat PoC Group); (4) an indication of when to join the multicast address (e.g., either immediately at reception of PoC Group information or only in conjunction with a PoC Session); and (5) priority information (the priority information having been explained above).

Act 5-4 of FIG. 5 reflects the possibility that a change may occur in the list which was the subject of a previous notification, such as the notification of act 5-3. A change may involve, for example, removal or addition of a PoC multiplexer group or when information for any of the PoC multiplexer groups is changed. Such change(s) necessitate a further notification to the wireless terminals. Accordingly, act 5-5 shows server 22 sending send information about the change in a SIP NOTIFY request to the wireless terminal 30. The wireless terminal 30 makes necessary changes, e.g., to disconnect from one multicast address and connect to another multicast address when the relevant multicast address is changed at act 5-4

In the mode now under consideration and described in FIG. 5, i.e., the case in which the wireless terminal 30 (UE or PoC Client) joins the multicast address 40 immediately, the wireless terminal 30 activates a PDP context (e.g., PDP (multicast) context 64) in order to immediately start to listen to the multicast address 40. Activation of the PDP context is generally depicted by act 5-6 through act 5-9 of FIG. 5. Act 5-6 involves wireless terminal 30 sending an IGMP Join(MC) message to server 22. In response, as act 5-7 the server 22 sends a MBMS Context Activate message to wireless terminal 30. As act 5-8 the wireless terminal 30 sends a MBMS Context Request message to server 22. As act 5-9 the server 22 returns a MBMS Context Response message to wireless terminal 30.

As a result of the actions performed in FIG. 5, wireless terminal 30 has joined multicast address 40 for the push to talk over cellular (PoC) multicast group as a passive recipient of transmissions and can thereby listen to the multicast address. Thus, as understood from the foregoing, to be able to listen to the multicast group, the PoC users establish multicast contexts (MBMS context) using the provisioned multicast address 40.

However, joining a PoC session for the push to talk over cellular (PoC) multiplexer group cannot occur without also setting up an additional connection—a unicast connection—in parallel to the multicast connection. The unicast connection is preferably a unicast IP connection, for which reason reference to "unicast IP connection" appears frequently hereinafter. The unicast IP connection is used for PoC Session related SIP signalling, media bursts in the uplink direction, and some of the media burst control signalling (MBCP signalling). Thus the wireless terminal 30 must also have at least one unicast PDP context (e.g., unicast connection 66) established in parallel with the multicast connection (e.g., PDP (multicast) context 64) in order to be an active participant in a PoC session (e.g., an active participant in session 70 of FIG. 1B).

Figure 7:
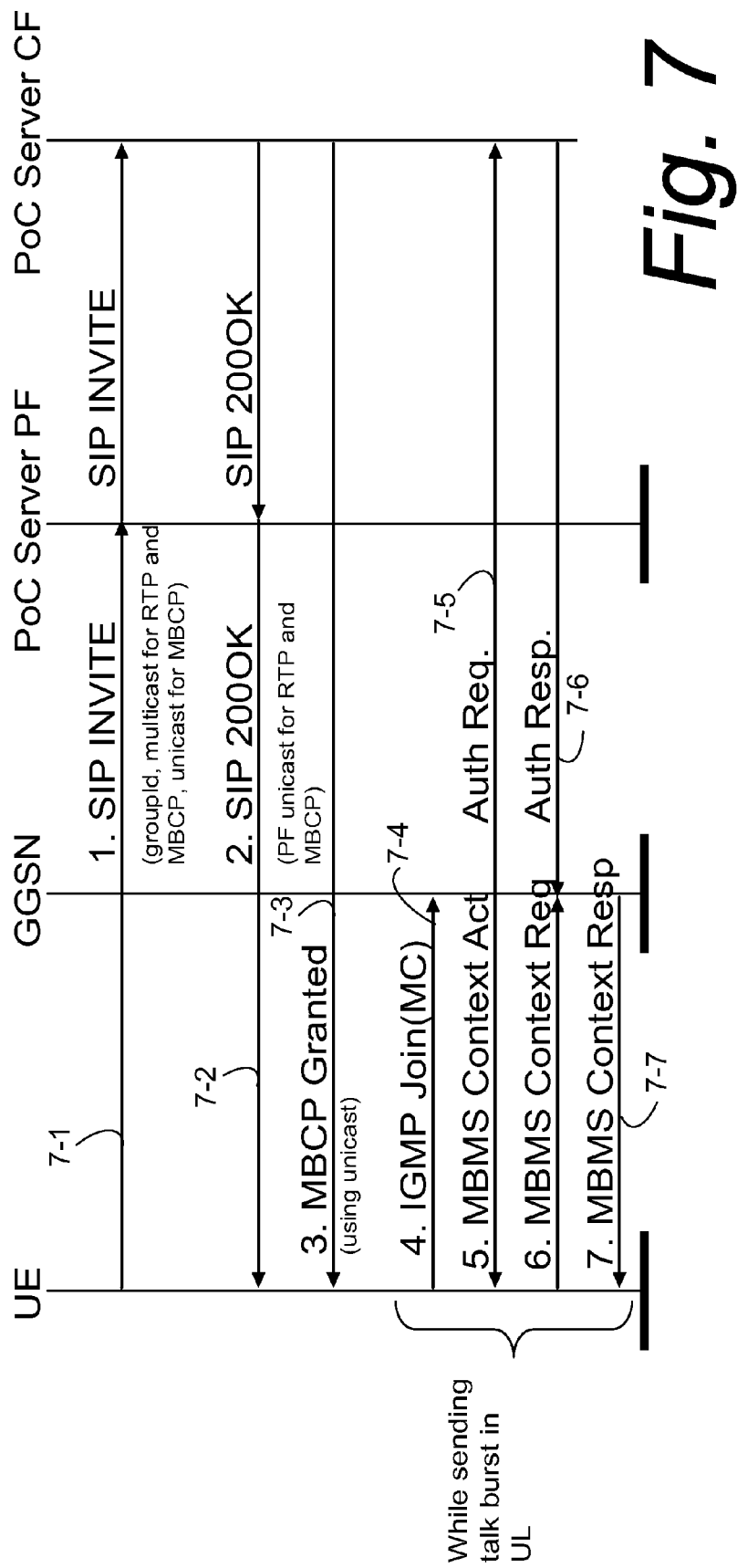
FIG. 7 illustrates example acts including signaling involved in a second join time scenario and signalling flows for a PoC User.

As also mentioned above, a second possible time to join the multicast address may be upon the wireless terminal 30 joining the push to talk over cellular (PoC) session 70. FIG. 7 illustrates example acts including signaling involved in this second join time scenario, and thus also illustrates signalling flows for a PoC User (e.g., wireless terminal 30) that originates the PoC communication and starts a PoC session for sending media burst to a push to talk over cellular (PoC) multiplexer group such as an emergency group.

Reference is made in FIG. 7 as in subsequent illustrations to both "PoC Server PF" and "PoC Server CF", as well as to the previously discussed GGSN node. A "PoC Server PF" is also known as a participating PoC function; a "PoC Server CF" is also known as a controlling PoC function. In a PoC session, each participant is connected to a participating PoC Function (PF). There is only one controlling PoC function (CF) connected to a PoC Session. The controlling PoC function is connected to the participating PoC function(s) and serves as the "conference bridge" in the PoC Session. The controlling PoC function (CF) is implemented in a PoC Server such as server 22, and provides centralized PoC Session handling, which includes RTP Media distribution, Talk Burst Control, policy enforcement for participation in the PoC Group Sessions, and the Participant information. On the other hand, the Participating PoC function (PF) (implemented in a PoC Server) provides PoC session handling, which includes policy enforcement for incoming PoC sessions and relays Media Burst Control and/or Talk Burst Control messages between the PoC Client and the PoC Server performing the controlling PoC Function. The participating PoC function may also relay media between the PoC Client and the PoC server performing the controlling PoC Function. Both the controlling PoC function and the participating PoC function are described in Push to Talk over Cellular (PoC)—Architecture, draft version 2.0—March 2007, Open Mobile Alliance, OMA-TS-PoC-ControlPlane-V2_0-20070402-D, which is incorporated herein by reference. The participating PoC function and the controlling PoC function can, in some scenarios, be co-located (ad-hoc and 1-1 PoC session). For purposes of the simplified architecture of FIG. 1B, the server 22 encompasses both the participating PoC function (PoC Server PF) and the controlling PoC function (PoC Server CF).

Act 7-1 of FIG. 7 comprises the UE/PoC Client (e.g., wireless terminal 30) sending a SIP INVITE message to the PoC Server PF indicating that wireless terminal 30 wants to establish a PoC Session and that wireless terminal 30 thereby wants to receive RTP Media and MBCP over the multicast address 40. The SIP INVITE message also indicates its unicast address for MBCP, such as terminal unicast address 80 shown in FIG. 3B, for example.

As act 7-2 the SIP INVITE request message is responded to with a message such as a SIP 200OK response message. The Session Description Protocol (SDP) indicates the unicast address(es) to which the UE/PoC client (e.g., wireless terminal 30) should send RTP Media and MBCP. These unicast addresses received at act 7-2 can be stored as server unicast address 84 in FIG. 3B, for example.

As act 7-3 the PoC Server CF sends a MBCP Granted message to indicate that the wireless terminal 30 has the right to send RTP Media. The MBCP Granted message may be sent over either the unicast address for MBCP, or over the multicast address, or both. In the case shown in FIG. 7, the wireless terminal 30 has not yet established the MBMS Context (e.g., PDP (multicast) context 64) prior to PoC Session set-up. Consequently, the MBCP Granted message of act 7-3 should be sent to wireless terminal 30 over the unicast address for MBCP.

Since FIG. 7 illustrates a case or scenario in which joining of the multicast address 40 occurs only in conjunction with a PoC Session, FIG. 7 further shows (as act 7-4 through act 7-7) the set up of PoC session (e.g., local clock 70) as occurring essentially in parallel with wireless terminal 30 joining the multicast address. Joining the multicast address essentially involves, as shown by act 7-4 in this particularly illustrated scenario, the wireless terminal 30 sending an IGMP Join message with its provisioned multicast address to the GGSN. The provisioned multicast address so sent is depicted as terminal multicast address 82 in FIG. 3B.

The IGMP Join message of act 7-4 triggers the GGSN to set-up a MBMS Context (e.g., PDP (multicast) context 64). As shown by act 7-5 of FIG. 5, setting up of the MBMS context involves the GGSN node sending a MBMS Context Activation message to wireless terminal 30 while it simultaneously authorizes the use of MBMS for this particular user. As act 7-6 wireless terminal 30 responds with a MBMS Context Request message. As act 7-7 the GGSN responds with a MBMS Context Response message when the MBMS Context is set-up and the wireless terminal 30 can start to receive RTP Media over the multicast connection (e.g., PDP (multicast) context 64). Act 7-7 happens when the wireless terminal 30 is either setting up the PoC Session or sending RTP Media in the uplink (and is not receiving any RTP Media since the service is half-duplex). There should be no issues with media clipping due to the multicast connection set-up delay.

Thus, in the example implementation above described with respect to FIG. 7, the wireless terminal does not join the multicast address for the PoC multicast group before the unicast connection with the wireless terminal is established. The act of establishing the unicast connection between a server hosting the push to talk over cellular (PoC) multicast group and the wireless terminal can be either by the wireless terminal initiating the establishing of the unicast connection, or by the server inviting the wireless terminal to join the push to talk over cellular (PoC) session.

As mentioned above, to be able to listen to the multicast group, the PoC Users establish multicast contexts (MBMS context) using the provisioned multicast address. When a user has established the MBMS context, the user is able to listen to the group. However, the user cannot send a media burst until he/she has joined the PoC session.

Figure 8:
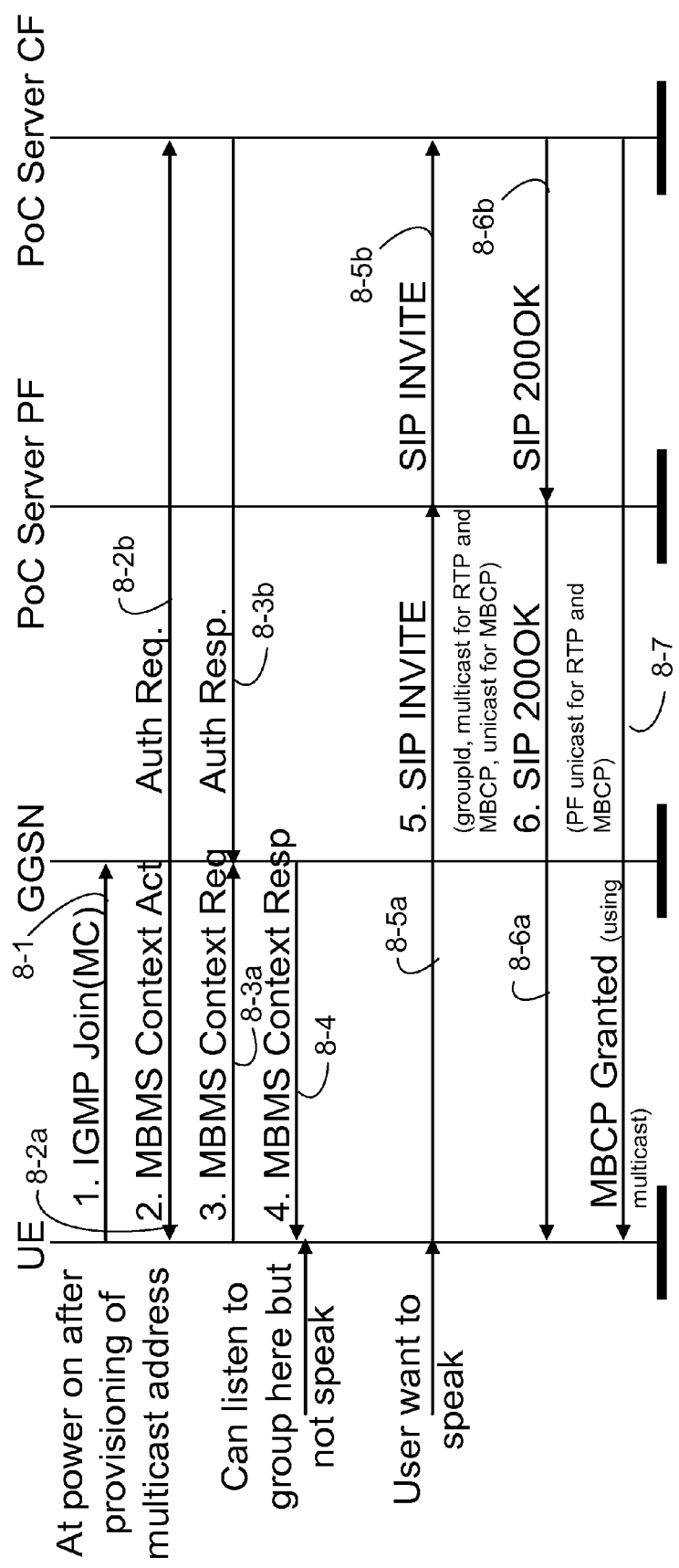
FIG. 8 illustrates a scenario in which a wireless terminal initiates establishing of a unicast connection and PoC session set up.

FIG. 8 particularly illustrates a scenario in which the wireless terminal initiates the establishing of the unicast connection, and thus of PoC session set up. Moreover, in the FIG. 8 scenario, the wireless terminal 30 starts to listen to the emergency group prior to PoC session establishment.

Act 8-1 of FIG. 8 comprises wireless terminal 30 sending an IGMP Join message with the provisioned multicast address (e.g., terminal multicast address 82) to the GGSN. It will be appreciated that act 7-1 occurs after the wireless terminal 30 receives the PoC group information (e.g., after acts such as act 5-1 through 5-3 of FIG. 5, for example).

The IGMP Join message of act 8-1 triggers the GGSN to set-up a MBMS Context. In this regard, as act 8-2a the GGSN sends a MBMS Context Activation message to the UE (e.g., wireless terminal 30) while (as act 8-2b) GGSN simultaneously authorizes the use of MBMS for this particular user. As act 8-3, the wireless terminal 30 responds with a MBMS Context Request message.

As act 8-4 the GGSN responds with a MBMS Context Response message when the MBMS Context is set-up (as indicated by the MBMS Authorization Response message of act 8-3b). At this point the wireless terminal 30 can start to receive RTP Media over the multicast connection (e.g., over a PDP (multicast) context 64 such as that illustrated in FIG. 1A).

When the wireless terminal 30 wants to joint the Chat PoC Group Session and to receive RTP Media and MBCP over the multicast address, as act 8-5a the wireless terminal 30(UE/PoC Client) sends a SIP INVITE to the PoC Server PF. The SIP INVITE message also includes and/or indicates, e.g., a unicast address for MBCP (such as terminal multicast address 82 shown in FIG. 3B). FIG. 8 also shows that the SIP INVITE message is forwarded to PoC Server CF as act 8-5b.

As act 8-6, the SIP INVITE request of act 8-5 is responded to by PoC Server PF with a SIP 200OK response. The Session Description Protocol (SDP) indicates the unicast address(es) to which the UE/PoC Client should send RTP Media and MBCP. The indicated unicast address is stored by wireless terminal 30 as server unicast address 84 as shown in FIG. 3B.

The PoC Server CF may, as act 8-7, send a MBCP Granted message to wireless terminal 30 to indicate that the UE/PoC Client has the right to send RTP Media after PoC Session establishment. The MBCP Granted message may be sent over either the unicast address for MBCP (e.g., over unicast connection 66) or over the multicast address (e.g., over PDP (multicast) context 64), or both. In the case of FIG. 8 the wireless terminal 30 joins the multicast address 40 immediately at reception of PoC Group information. Therefore, the MBCP Granted message of act 8-7 can be sent over the multicast address for MBCP.

Thus, the FIG. 8 scenario illustrates a PoC Chat Group having a multicast address 40 which is joinable immediately at reception of PoC Group information". Since the PoC User joins the multicast group at reception of the PoC Group information he/she can listen directly after start of the service. However, the PoC User cannot speak until he/she joins the PoC Session, because only after joining the PoC Session does the user also have the unicast connection.

Figure 9:
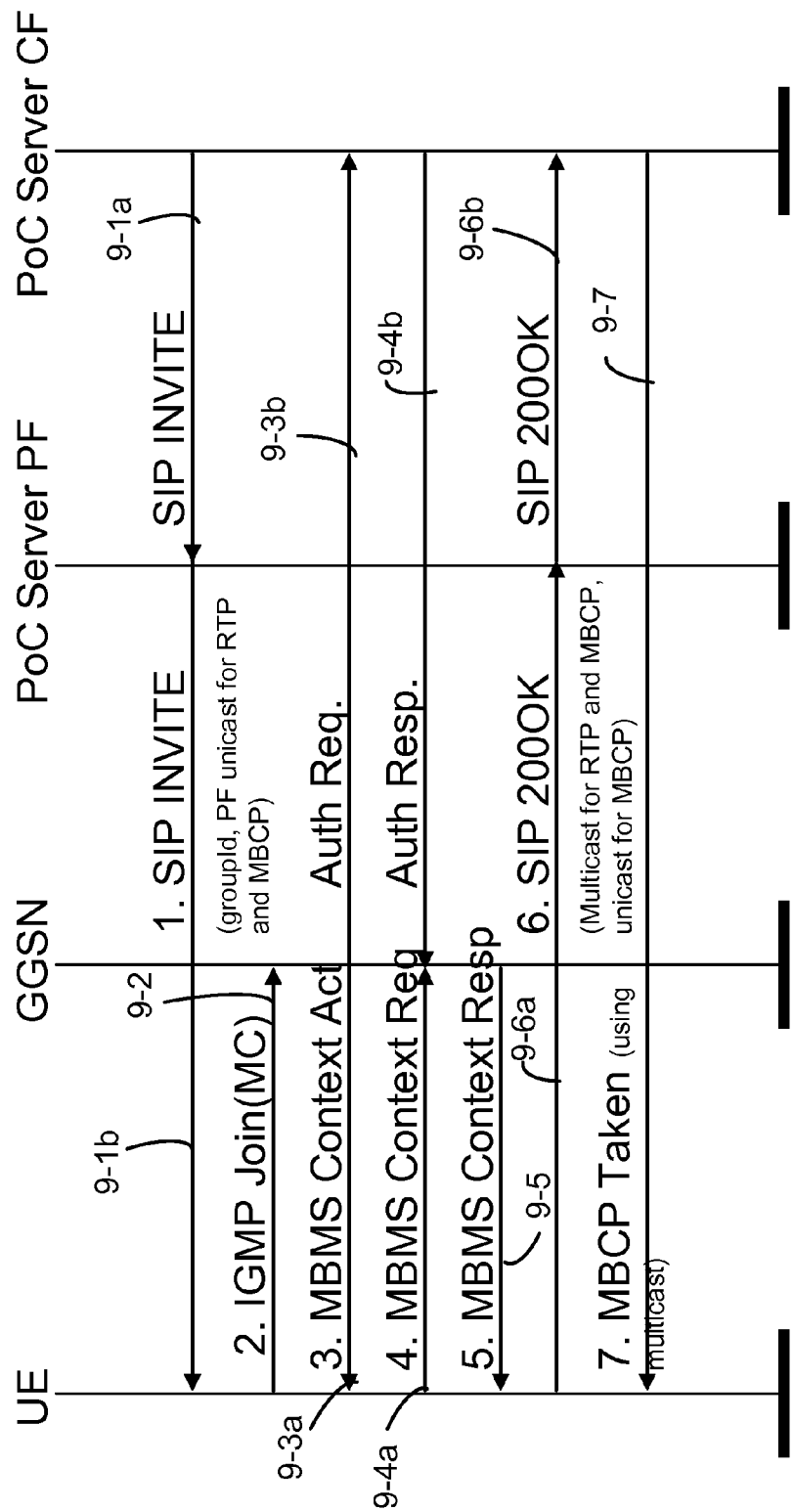
FIG. 9 illustrates a scenario in which a wireless terminal starts to listen to a multicast address at establishment of a PoC session.

FIG. 9 particularly illustrates a scenario in which wireless terminal 30 starts to listen to the multicast address 40 only at establishment of the PoC session. Accordingly, as act 9-1a, at PoC Session establishment, the PoC Server CF sends a SIP INVITE message to the PoC User(s), e.g., to wireless terminal 30. FIG. 9 further shows that the SIP INVITE message is relayed by PoC Server PF as act 9-1b to the PoC User(s). The SDP indicates the unicast address(es) of the server 22 to which the UE/PoC Client should send RTP Media and MBCP. This unicast address is stored as shown by server unicast address 84 in FIG. 3B.

Since, for the scenario of FIG. 9, the time to join the multicast address is "only in conjunction with a PoC Session", the UE needs to start to listen to the multicast address 40 before the PoC Session set-up is complete. Accordingly, as act 9-2 the UE sends an IGMP Join message with the provisioned multicast address to the GGSN.

The IGMP Join message of act 9-2 triggers the GGSN to set-up a MBMS Context (e.g., PDP (multicast) context 64 of FIG. 1A). In setting up the MBMS context, as act 9-3 the GGSN node sends a MBMS Context Activation message to the UE while (as act 9-3b) it simultaneously authorizes the use of MBMS for this particular user by sending an Authorization Request message to PoC Server CF.

In response to the MBMS Context Activation message of act 9-3a, the UE responds as act 9-4a with a MBMS Context Request message. As act 9-5 the GGSN node responds with a MBMS Context Response message when the MBMS Context is set-up (as confirmed by the MBMS Authorization Response message of act 9-4b) and the UE can start to receive RTP Media over the multicast connection (e.g., PDP (multicast) context 64 of FIG. 1B).

After having established the MBMS Context, as act 9-6a the UE/PoC Client sends a SIP 200OK message to the PoC Server PF indicating that the PoC client wants to join the Chat PoC Group Session and that the PoC client wants to receive RTP Media and MBCP over the multicast address. The SIP 200OK message of act 9-6a also indicates a terminal unicast address for MBCP, e.g., terminal unicast address 80 of FIG. 3B. The SIP 200OK message of act 9-6a is forwarded as act 9-6b by PoC Server PF to the PoC Server CF.

As act 9-7 the PoC Server CF sends a MBCP Taken message to the PoC client (e.g., wireless terminal 30) indicate that the originating UE/PoC Client is sending RTP Media. The MBCP Taken message(s) is sent over the multicast address 40.

As mentioned several times above, a UE/PoC Client can join a multicast address either immediately or only when participating in a PoC Session. When the UE/PoC Client joins immediately to the multicast address, the PoC User at the PoC Client can listen to ongoing conversations in the Pre-arranged- or Chat PoC Group Session. However, since the PoC Client has not joined the PoC Session, and has not initiated the PoC Session nor has been invited to the PoC Session, the PoC User can neither participate in an ongoing conversation nor receive Sender Identification, e.g., the PoC User can not receive information about, e.g., who is talking.

In order to make it possible for a PoC User to receive Sender Identification the MBCP Media Burst Taken and the Media Burst Idle message shall be sent over the multi cast connection.

Figure 10:
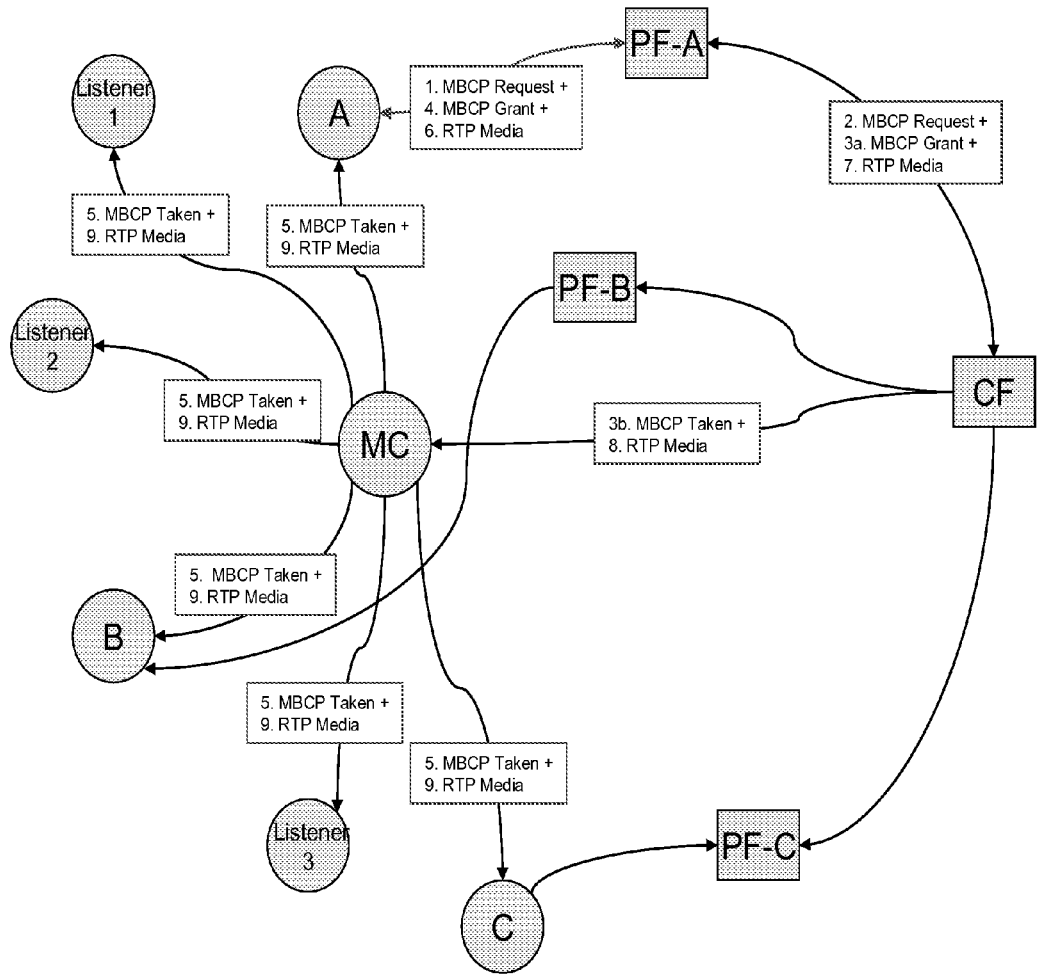
FIG. 10 is a diagrammatic view depicting multicasting of Media Burst Control Messages.

FIG. 10 illustrates a scenario which shows how a PoC Client which has only joined the multicast address 40 can receive information about who is talking by means of the MBCP Media Burst Control Taken message sent over the multi cast connection. FIG. 10 thus depicts multicasting of Media Burst Control Messages. In FIG. 10, Listener 1, Listener 2, and Listener 3 are PoC Clients that joined to the multicast address immediately. On the other hand, PoC client A, PoC client B and PoC client C are PoC Clients participating actively in an ongoing PoC Session. PoC Server PF-A, PoC Server PF-B and PoC Server PF-C are Participating PoC Functions. Example acts, events, or steps performed in the scenario of FIG. 10 are indicated by numerals 1-9 which are shown in the various boxes of FIG. 10.

Act 1 of FIG. 10 comprises PoC Client A requesting permission to speak by means of the MBCP Media Burst Request message. As act 2 of FIG. 10 the participating PoC Function PF-A forwards the MBCP Media Burst Request message to the Controlling PoC Function, e.g., to CF. As act 3 the Controlling PoC Function grants the request and performs act 3a and act 3b. Act 3a comprises the controlling function CF sending a MBCP Media Burst Granted message towards PoC Client. Act 3b comprises the Controlling PoC Function sending a MBCP Media Burst Taken message towards the multicast address (MC) obtained from PoC Group information.

As act 4, the Participating PoC Function PF-A forwards the MBCP Media Burst Taken message to the PoC Client A. The MBCP Media Burst Taken message is then distributed as act 5 to all PoC Clients that have joined the multicast address received as described previously, i.e., Listener 1, Listener 2, and Listener 3, and wireless terminal A, wireless terminal B, and wireless terminal C.

As act 6, the PoC Client A starts to send RTP Media packets towards the Participating PoC Function PF-A. The Participating PoC Function PF-A sends the RTP Media packets to the Controlling PoC Function CF as act 7. The Controlling PoC Function CF then as act 8 sends the RTP Media packets towards the multicast address (MC) obtained from PoC Group information. The RTP Media packets are then distributed as act 9 to all PoC Clients that have joined the multicast address (received as described above), i.e. Listener 1, Listener 2, and Listener 3, and wireless terminal A, wireless terminal B, and wireless terminal C.

A listener (e.g., passive participant) to an ongoing PoC Session can at any point joint the ongoing PoC Session by initiating the unicast connection as described, e.g., with reference to acts such as act 8-1 through 8-4 of FIG. 8.

Figure 11:
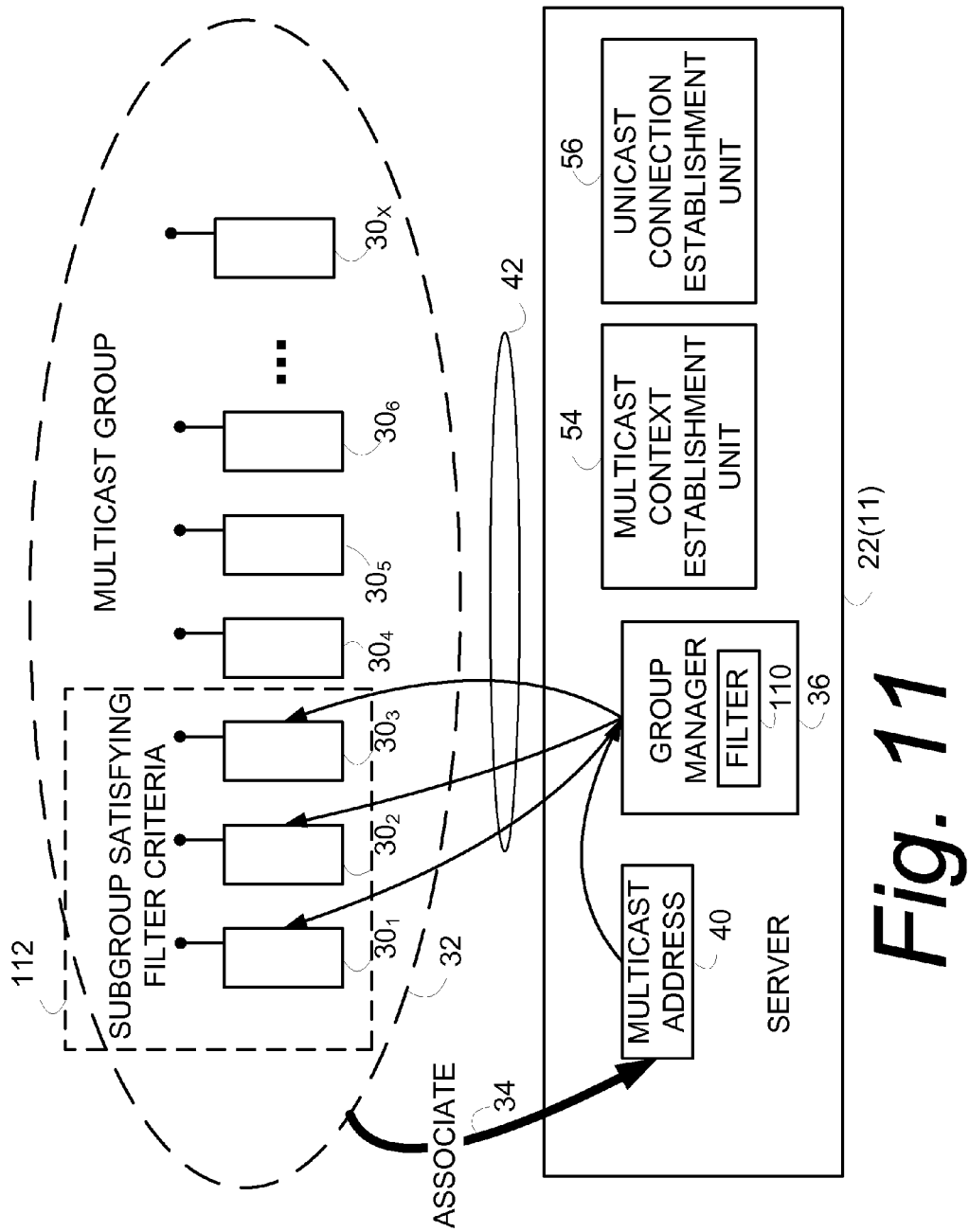
FIG. 11 is a diagrammatic view of an example push to talk multicast group subject to a filter.

Even though a push to talk over cellular (PoC) multicast group can be pre-arranged, the server 22 can be configured with a filter or the like so that only group members meeting certain criteria are actually invited into the active group. As an example, FIG. 11 shows a server 22(11) whose group manager 36 comprises dynamic filter 110. Although push to talk over cellular (PoC) multicast group 23 of FIG. 11 comprises wireless terminal $30_1$ through $30_n$, in the particularly illustrated scenario of FIG. 11 the dynamic filter 110 selects only terminal $30_1$ through $30_3$ as those which satisfy a filter criteria for forming a push to talk over cellular (PoC) multicast (sub) group 112 as active participants in the PoC session. In other words, only terminal $30_1$, terminal $30_2$, and terminal $30_3$ are invited to or permitted membership in the PoC session. The filtering criteria can vary by push to talk over cellular (PoC) multicast group, time, or other circumstance. Examples of filtering criteria include geographical location and predetermined presence state (e.g., on-duty), etc.

Figure 12:
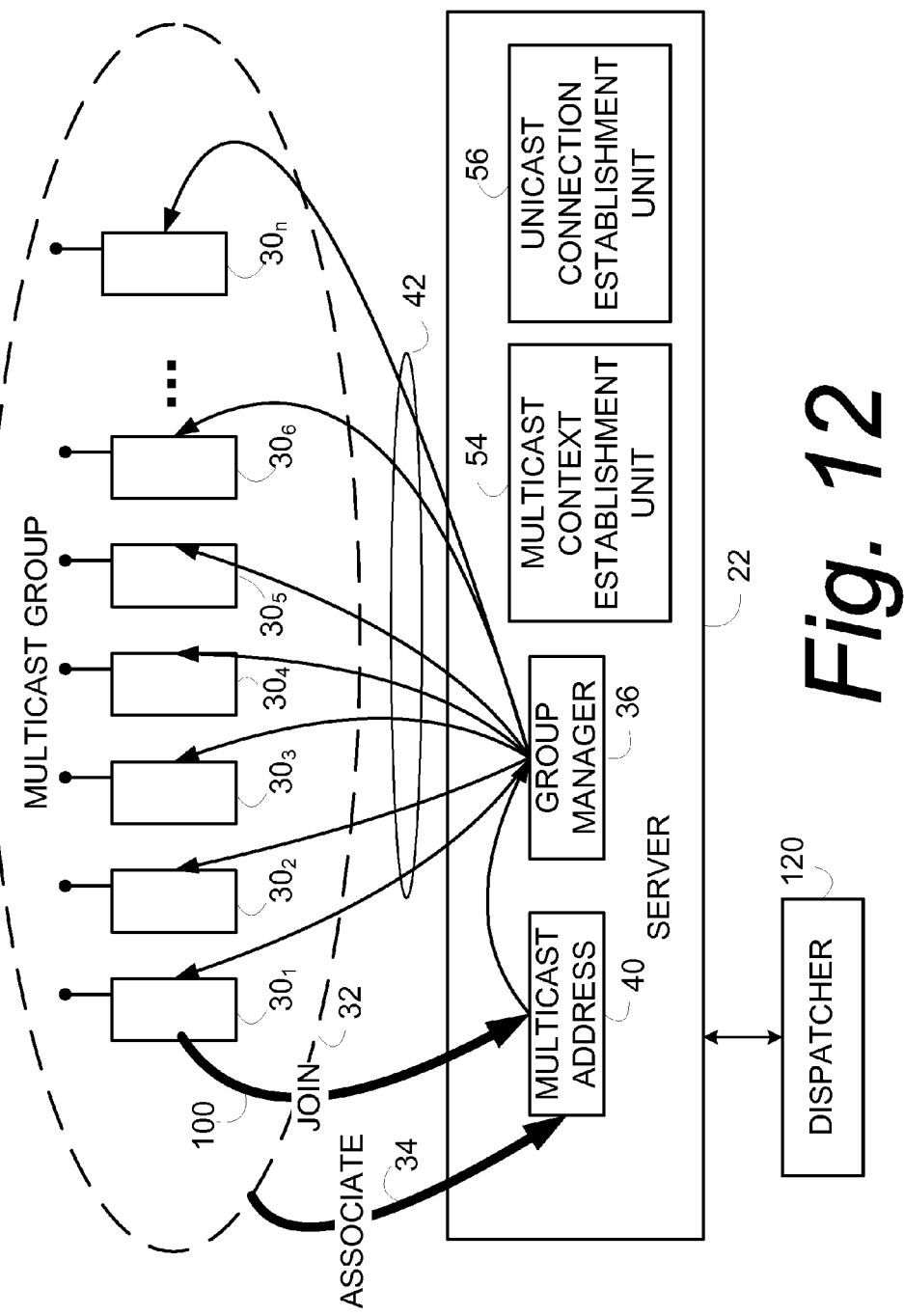
FIG. 12 is a diagrammatic view of an example situation in which as dispatcher uses a push to talk multicast group.

FIG. 12 shows a scenario in which server 22(12) is connected to a dispatcher 120. The dispatcher 120 can be connected to server 22(12) either by wired or wireless connection. The dispatcher 120 is a unit for an operator using a one-to-many-to-one mode. For example, a dispatcher is an operator of the type that talks with a number of taxi drivers, and wherein the taxi driver can reply but only the dispatcher can hear the answer. Use of the dispatcher 120 and the dispatcher functionality in general is understood with reference to OMA PoC 2.0. Thus, as shown in FIG. 12, a Dispatcher PoC Group can use the multicast functionality by adding multicast group information to the dispatcher PoC Group.

As another example augmentation and/or variation, in an example implementation, the method further comprises configuring or provisioning the terminal with a multicast group address to which the terminal sends a subscribe request to a server. Once contacted at the server's multicast group address, the server sends the push to talk multicast group information to the terminal.

Another aspect of the technology concerns a server for hosting communications among a push to talk multicast group. In an example implementation, the server comprises both a multicast context establishment unit and a unicast connection establishment unit. The multicast context establishment unit is configured to enable a terminal to join a multicast address for the multicast group and to establish a PDP context whereby the terminal can join the multicast address as a passive recipient of transmissions of the multicast group. The unicast connection establishment unit is configured to establish a unicast connection between the server and the terminal and thereby facilitate active participation of the terminal in the push to talk session for the multicast group.

The technology thus encompasses a push to talk system that uses multicast for the purpose of doing efficient group communication. The push to talk system allows users to become passive listener to the communication prior being an active part of the session. The user can switch from being a passive listener to become an active participant of the Session. The system features a multicast address which users may join. The multicast address for a push to talk multicast group can be stored by a server for the purpose of allowing for efficient group communication. The multicast address can be provisioned to users by, e.g., using a SIP event package. Further, the system can supply or provision to the terminal the time or criteria for when to start to listen to the multicast address. The system can optionally use user/usage information such as position or presence status to invite users to the multicast group communication. Moreover, the system can optionally allow dispatchers to create Groups and assign multicast addresses to them to allow for efficient group communication. The system can handle the multicast address as one passive participant in the group session (meaning that that users listening to unicast and multicast connections can coexists in the Session).

The technology described herein affords numerous advantages and capabilities, including but not limited to the following:

(1) Many users can listen to a session at the same time without occupying resources (e.g., of the radio access network).

(2) Multicast functionality can be combined with Dynamic Group functionality, e.g., clients can be invited based on criteria such as (for example) the geographic position or presence status (e.g. on-duty).

(3) Multicast can be combined with functionality with dispatcher groups.

(4) A user can listen to an ongoing conversation in a multicast group without actively participate in the session.

(5) A user can switch from passive listener to an active participant in an ongoing session.

(6) The technology is particularly but not exclusively applicable to push to talk over cellular (PoC) wherein the terminal is a wireless terminal Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating a telecommunications system comprising:
   (a) providing a terminal with push to talk multicast group information and a capability of participating in a push to talk multicast group in either of two modes of push to talk multicast group participation;
   (b) in a first mode enabling the terminal to join a multicast address at a join time as a passive recipient of transmissions of a push to talk multicast group through a multicast connection having a multicast context, in the first mode the terminal not being able to send media bursts to the multicast group;
   (c) in a second mode establishing a unicast connection as an additional and parallel connection between the terminal and a server for a session for the multicast group before the terminal can become an active participant in the session and send media bursts to the multicast group, the unicast connection having a unicast context and being connected to an unicast address of the server, and
   (d) providing the join time to the terminal, the join time specifying either (1) the terminal is to join the multicast address upon receipt by the terminal of the push to talk group information and thereby initially participate in the multicast group in the first mode or (2) the terminal is to join the multicast address upon joining the push to talk session and thereby initially participate in the multicast group in the second mode.

2. The method of claim 1, wherein act (c) comprises establishing a unicast Internet Protocol (IP) connection with the terminal.

3. The method of claim 1, wherein act (c) comprises establishing the unicast connection with the terminal to facilitate transmission of media bursts in an uplink direction from the terminal.

4. The method of claim 1, wherein act (b) is permitted after receipt of the push to talk multicast group information whereby the terminal can join the multicast address as a passive recipient of transmissions of a push to talk multicast group.

5. The method of claim 1, wherein act (b) is not permitted before act (c).

6. The method of claim 1, further comprising:
   configuring or provisioning the terminal with a multicast group address to which the terminal sends a subscribe request to a server; and
   using the server for providing the terminal with the push to talk multicast group information.

7. The method of claim 6, further comprising provisioning the multicast address using a Session Initiation Protocol (SIP) event package.

8. The method of claim 1, further comprising providing the terminal with the push to talk multicast group information for plural multicast groups.

9. The method of claim 1, further comprising the terminal initiating the establishing of the unicast connection as act (c), and wherein act (b) does not precede act (c).

10. The method of claim 1, further comprising a server sending the terminal an invitation for the active participation in the push to talk session.

11. The method of claim 1, wherein act (b) follows act (c).

12. The method of claim 1, further comprising apprising the terminal when to join the multicast address.

13. The method of claim 1, wherein the push to talk multicast group information comprises at least one of the following: name of the push to talk multicast group; the multicast address; a type of the push to talk multicast group; an indication of when to join the multicast address.

14. The method of claim 1, wherein the terminal is a wireless terminal and the multicast group is a push to talk over cellular (PoC) multicast group.

15. The method of claim 1, further comprising configuring the terminal with the join time.

16. The method of claim 1, further comprising the server supplying the terminal with the join time.

17. The method of claim 1, further comprising providing the terminal with the capability of participating in both the first mode and the second mode but wherein the terminal joins one of the first mode and the second mode depending upon a join time specification.

18. A terminal for participating in a push to talk multicast group in either of two modes of push to talk multicast group participation, the terminal comprising:
    a multicast context establishment unit configured in a first mode to enable the terminal to join a multicast address for the multicast group and to establish a multicast context whereby the terminal can join the multicast address at a join time as a passive recipient of transmissions of the multicast group, in the first mode the terminal not being able to send media bursts to the multicast group;
    a unicast connection establishment unit configured in a second mode to establish a unicast connection as an additional and parallel connection between a server which hosts the push to talk multicast group and the terminal before active participation of the terminal in the push to talk session for the multicast group and before the terminal can send media bursts to the multicast group, the unicast connection having a unicast context and being connected to a unicast address of the server;
    the join time specifying either (1) the terminal is to join the multicast address upon receipt by the terminal of push to talk group information and thereby initially participate in the multicast group in the first mode or (2) the terminal is to join the multicast address upon joining the push to talk session and thereby initially participate in the multicast group in the second mode.

19. The apparatus of claim 18, further comprising a subscription unit configured to obtain push to talk multicast group information needed to enable the terminal to join the multicast address for the multicast group.

20. The apparatus of claim 18, wherein the terminal is a wireless terminal and the multicast group is a push to talk over cellular (PoC) multicast group.

21. The terminal of claim 18, wherein the terminal has a capability of participating in both the first mode and the second mode but wherein the terminal joins one of the first mode and the second mode depending upon a join time specification.

22. A server for hosting communications among a push to talk multicast group including a terminal having a capability of participating in a push to talk multicast group in either of two modes of push to talk multicast group participation, the server comprising:
    a multicast context establishment unit configured in a first mode to enable the terminal to join a multicast address for the multicast group and to establish a multicast context whereby the terminal can join the multicast address at a join time as a passive recipient of transmissions of the multicast group, in the first mode the terminal not being able to send media bursts to the multicast group;
    a unicast connection establishment unit configured in a second mode to establish a unicast connection as an additional and parallel connection between the server and the terminal before active participation of the terminal in the push to talk session for the multicast group and before the terminal can send media bursts to the multicast group, the unicast connection having a unicast context and being connected to a unicast address of the server; and
    the server providing the join time to the terminal, the join time specifying either (1) the terminal is to join the multicast address upon receipt by the terminal of push to talk group information and thereby initially participate in the multicast group in the first mode or (2) the terminal is to join the multicast address upon joining the push to talk session and thereby initially participate in the multicast group in the second mode.

23. The apparatus of claim 22, wherein the unicast connection is a wireless connection and the multicast group is a push to talk over cellular (PoC) multicast group.

24. The server of claim 22, wherein the terminal has a capability of participating in both the first mode and the second mode but wherein the terminal joins one of the first mode and the second mode depending upon a join time specification.

25. A method of operating a telecommunications system comprising:
    in a first mode of push to talk multicast group participation, a terminal joining a multicast address at a join time as a passive recipient of transmissions of a push to talk multicast group through a multicast connection having a multicast context, in the first mode the terminal not being able to send media bursts to the multicast group;
    in a second mode of push to talk multicast group participation, establishing a unicast connection as an additional and parallel connection between the terminal and a server for a session for the multicast group before the terminal can become an active participant in the session and send media bursts to the multicast group, the unicast connection having a unicast context and being connected to an unicast address of the server;
    providing the join time to the terminal, the join time specifying either (1) the terminal is to join the multicast address upon receipt by the terminal of push to talk group information and thereby initially participate in the multicast group in the first mode or (2) the terminal is to join the multicast address upon joining the session and thereby initially participate in the multicast group in the second mode.

26. The method of claim 25, further comprising establishing a unicast Internet Protocol (IP) connection between the terminal and the server for the session.

27. The method of claim 25, further comprising provisioning the multicast address using a Session Initiation Protocol (SIP) event package prior to set up of the session.

28. The method of claim 25, wherein the terminal is a wireless terminal and the multicast group is a push to talk over cellular (PoC) multicast group.

29. The method of claim 25, further comprising configuring the terminal with the join time.

30. The method of claim 25, further comprising the server supplying the terminal with the join time.

31. The method of claim 25, further comprising providing the terminal with the capability of participating in both the first mode and the second mode but wherein the terminal joins one of the first mode and the second mode depending upon a join time specification.

* * * * *

UNITED STATES PATENT AND TRADEMARK OFFICE
CERTIFICATE OF CORRECTION

PATENT NO. : 8,447,340 B2
APPLICATION NO. : 11/696428
DATED : May 21, 2013
INVENTOR(S) : Synnergren et al.

Page 1 of 1

It is certified that error appears in the above-identified patent and that said Letters Patent is hereby corrected as shown below:

In the Specification

In Column 11, Line 38, delete "act 5-4" and insert -- act 5-4. --, therefor.

In Column 16, Line 32, delete "$30_1$" and insert -- $30_1$, --, therefor.

Signed and Sealed this
Fifteenth Day of October, 2013

Teresa Stanek Rea
*Deputy Director of the United States Patent and Trademark Office*